(12) United States Patent
Colby et al.

(10) Patent No.: US 11,910,793 B2
(45) Date of Patent: Feb. 27, 2024

(54) MULTIFUNCTIONAL AGRICULTURAL ADJUVANT COMPOSITIONS

(71) Applicant: WINFIELD SOLUTIONS, LLC, Arden Hills, MN (US)

(72) Inventors: Christine M. Colby, Lino Lakes, MN (US); Elizabeth Alonzi, Saint Paul, MN (US); Danny M. Brown, Woodbury, MN (US)

(73) Assignee: WinField Solutions, LLC, Arden Hills, MN (US)

( * ) Notice: Subject to any disclaimer, the term of this patent is extended or adjusted under 35 U.S.C. 154(b) by 0 days.

(21) Appl. No.: 16/750,735

(22) Filed: Jan. 23, 2020

(65) Prior Publication Data

US 2020/0236929 A1     Jul. 30, 2020

Related U.S. Application Data

(60) Provisional application No. 62/796,236, filed on Jan. 24, 2019.

(51) Int. Cl.
| | | |
|---|---|---|
| *A01N 65/08* | (2009.01) | |
| *A01N 25/30* | (2006.01) | |
| *A01N 65/40* | (2009.01) | |
| *A01N 25/04* | (2006.01) | |

(52) U.S. Cl.
CPC .............. *A01N 25/30* (2013.01); *A01N 25/04* (2013.01)

(58) Field of Classification Search
CPC ........ A01N 25/30; A01N 25/04; A01N 25/06; A01N 25/00
See application file for complete search history.

(56) References Cited

U.S. PATENT DOCUMENTS

| | | | |
|---|---|---|---|
| 3,994,438 A | 11/1976 | Farmery | |
| 4,193,356 A | 3/1980 | Vehe et al. | |
| 4,844,346 A | 7/1989 | Coffey | |
| 5,922,649 A * | 7/1999 | Pehu | A01N 37/44 504/320 |
| 6,423,667 B1 | 7/2002 | Highsmith | |
| 6,607,146 B1 | 8/2003 | Alness et al. | |
| 6,797,673 B1 | 9/2004 | Worthley et al. | |
| 6,890,889 B1 | 5/2005 | Wichert et al. | |
| 7,666,242 B2 | 2/2010 | Gednalske et al. | |
| 8,689,619 B2 | 4/2014 | Spandl et al. | |
| 8,809,234 B1 | 8/2014 | Parrish | |
| 9,714,893 B2 * | 7/2017 | Driscoll | G01N 15/02 |
| 9,938,201 B1 | 4/2018 | Scott et al. | |
| 10,359,337 B1 | 7/2019 | Bissel et al. | |
| 10,464,080 B1 | 11/2019 | Hagberg | |
| 10,775,264 B1 | 9/2020 | Bissell et al. | |
| 2004/0069875 A1 | 4/2004 | Bui | |
| 2006/0011741 A1 | 1/2006 | Hahn et al. | |
| 2006/0231000 A1 | 10/2006 | Eastin et al. | |
| 2006/0264328 A1 * | 11/2006 | Modaressi | C08K 5/0058 504/165 |
| 2009/0241817 A1 | 10/2009 | Eastin et al. | |
| 2013/0037625 A1 | 2/2013 | Arenson et al. | |
| 2013/0123104 A1 | 5/2013 | Mcknight et al. | |
| 2013/0180325 A1 | 7/2013 | Spandl et al. | |
| 2013/0324401 A1 | 12/2013 | Spesard et al. | |
| 2014/0018240 A1 | 1/2014 | Crosby et al. | |
| 2015/0038442 A1 | 2/2015 | Van Der Krieken et al. | |
| 2015/0045224 A1 | 2/2015 | Parrish | |
| 2015/0150249 A1 | 6/2015 | Nolte et al. | |
| 2015/0237851 A1 | 8/2015 | Drew | |
| 2015/0250165 A1 | 9/2015 | Balastre et al. | |
| 2015/0272106 A1 | 10/2015 | Schertz | |
| 2016/0165885 A1 * | 6/2016 | Wikeley | A01N 43/653 504/144 |
| 2016/0192642 A1 | 7/2016 | Lindner et al. | |
| 2016/0192649 A1 | 7/2016 | Lindner | |
| 2016/0227765 A1 | 8/2016 | Di Modugno et al. | |

(Continued)

FOREIGN PATENT DOCUMENTS

| | | |
|---|---|---|
| AU | 2013206347 A1 | 1/2014 |
| CA | 104349674 A | 2/2015 |

(Continued)

OTHER PUBLICATIONS

Stevens, P. and Kimberley M. Pestic. Sci. 1993, 38, 237-245 (Year: 1993).*
Yarveicy, H. and Haghtalab, A. Journal of Dispersion Science and Technology 2018, V. 39, No. 4, 522-530 (Year: 2018).*
Kixor, U.S. EPA, Pesticides, Label, Kixor Herbicide [online]. Jan. 21, 2011 [retrieved on Nov. 29, 2021]. Retrieved from the Internet: <https://www3.epa.gov/pesticides/chem_search/ppls/007969-00324-20110121.pdf (Year: 2011).*
Castro, M. and Ojeda C. Environ Chem Lett (2014) 12:85-95 (Year: 2014).*
AG Spray, Inc., "Safety Data Sheet—HALT "Drift Reduction Aid"", Apr. 28, 2016, 5 pages.

(Continued)

*Primary Examiner* — Mina Haghighatian
*Assistant Examiner* — Janice Y Silverman
(74) *Attorney, Agent, or Firm* — Dorsey & Whitney LLP (57) ABSTRACT

Multifunctional agricultural adjuvant compositions ("MAACs") include at least one liquid component and one or more solid agricultural particles dispersed in the liquid component. The liquid component may include at least one methylated seed oil. Examples of the solid agricultural particles include ammonium sulfate, other water conditioners, amino acids, or polymers. The MAAC exhibits one or more desired functions depending on the quantity and composition of the liquid component, the quantity and composition of the solid agricultural particles, and, optionally, adding one or more surfactants and/or one or more additional components (e.g., rheology modifiers) to the MAAC. The desired functions of the MAAC may include at least one of a water conditioner, a surfactant, a high surfactant oil concentrate, a crop oil concentrate, or a drift reduction and a deposition adjuvant.

12 Claims, 1 Drawing Sheet

(56) References Cited

U.S. PATENT DOCUMENTS

| | | | |
|---|---|---|---|
| 2016/0360744 A1 | 12/2016 | Magidow et al. | |
| 2016/0374334 A1 | 12/2016 | Di Modugno et al. | |
| 2017/0006859 A1 | 1/2017 | Raman et al. | |
| 2017/0036228 A1 | 2/2017 | Thurow et al. | |
| 2017/0042142 A1 | 2/2017 | Baur et al. | |
| 2017/0086363 A1 | 3/2017 | Tribelhorn | |
| 2017/0113978 A1* | 4/2017 | Wheeler | C05G 3/80 |
| 2017/0127668 A1* | 5/2017 | Berg | A01N 25/30 |
| 2017/0238536 A1 | 8/2017 | Goyal et al. | |
| 2017/0258078 A1 | 9/2017 | Costa et al. | |
| 2018/0052088 A1 | 2/2018 | Sarkar et al. | |
| 2018/0055045 A1 | 3/2018 | Baur et al. | |
| 2018/0077927 A1 | 3/2018 | Bonn | |
| 2018/0143100 A1 | 5/2018 | Lindner | |
| 2018/0184647 A1 | 7/2018 | Bissell et al. | |
| 2019/0037836 A1 | 2/2019 | Bissell et al. | |
| 2021/0016309 A1 | 1/2021 | Bremer et al. | |

FOREIGN PATENT DOCUMENTS

| | | | |
|---|---|---|---|
| CA | 105191974 A | 12/2015 | |
| CN | 1612690 A | 5/2005 | |
| CN | 101076255 A | 11/2007 | |
| CN | 101646349 A | 2/2010 | |
| CN | 101715295 A | 5/2010 | |
| CN | 103153052 A | 6/2013 | |
| CN | 103687487 A | 3/2014 | |
| CN | 104250419 A | 12/2014 | |
| CN | 105451551 A | 3/2016 | |
| CN | 108294043 A | 7/2018 | |
| CN | 108402034 A | 8/2018 | |
| CN | 110139560 A | 8/2019 | |
| JP | 2005112792 A * | 4/2005 | |
| WO | 0219823 A2 | 3/2002 | |
| WO | WO-0219823 A2 * | 3/2002 | A01N 41/10 |
| WO | 2006065815 A1 | 6/2006 | |
| WO | WO-2006133788 A1 * | 12/2006 | A01N 57/20 |
| WO | 2008065990 A1 | 6/2008 | |
| WO | 2009002810 A1 | 12/2008 | |
| WO | 2010001184 A1 | 1/2010 | |
| WO | 2011046374 A2 | 4/2011 | |
| WO | 2011065831 A2 | 6/2011 | |
| WO | 2012018885 A1 | 2/2012 | |
| WO | 2012177851 A1 | 12/2012 | |
| WO | 2013181090 A2 | 12/2013 | |
| WO | 2015023434 A1 | 2/2015 | |
| WO | 2015175719 A1 | 11/2015 | |
| WO | 2016145000 A1 | 9/2016 | |
| WO | 2018126017 A1 | 7/2018 | |

OTHER PUBLICATIONS

Agrisolutions, "Preference® Adjuvant Sell Sheet", Winfield Solutions, LLC, 2011, 2 pages.

ANSI/ASABE S592.1, "Best Management Practices for Boom Spraying", American Society of Agricultural and Biological Engineers, Aug. 2016, 14 pages.

Davis, Jason A. et al., "Mitigating Pesticide Spray Drift", Agriculture and Nature Resources; University of Arkansas, U.S. Department of Agriculture, and County Governments Cooperating, University of Arkansas, Agriculture and Nature Resources, FSA2179, May 2015, 6 pages.

EPO, "Extended European Search Report", App. No. 19210537.7-1110, dated Apr. 2, 2020, 6 pages.

EPO, "Extended European Search Report", App. No. 19210568.2-1001, dated Apr. 3, 2020, 9 pages.

Halecky, Alan et al., "Evaluation of a Modified Guar OD Formulation for Spray Drift Mitigation", Journal of ASTM International; vol. 8, No. 10, Aug. 31, 2011, 13 pages.

Halt, "Drift Reduction Agent Product Label", https://s3-US-west-2.amazonaws.com/greenbook-assets/L111240.pdf, Accessed: Feb. 28, 2018, 1 page.

Interlock by Winfield, "Versatile Drift Reduction and Deposition", 2012, 2 pages.

NA Agro Lab, "Contact Angle and Drave's Wetting Report for DV 5-8135", NA Agro Lab, May 23, 2016, 6 pages.

NA Agro Lab, Solvay Brstol R & I, "DV 5-8135 Physical Property, Compatibility and DRT Data Report", NA Agro Lab, Solvay Bristol R&I, May 6, 2016, 10 pages.

Ng, et al., Ng, C.-L. et al. "Bag breakup of nonturbulent liquid jets in crossflow." International Journal of Multiphase Flow 34 (2008) pp. 241-259., Jan. 1, 2008.

PCT, "International Search Report and Written Opinion", Application No. PCT/US2017/068729, dated Mar. 11, 2018, 12 pages.

PCT, "International Search Report and Written Opinion", Application No. PCT/US2019/040002, dated Sep. 12, 2019, 13 pages.

Rhodia, "AG-RHOSPEC 7713 Regulatory Profile Sheet", Apr. 3, 2012, 1 page.

Rhodia, "AG-RHOSPEC® 7713 Product Data Sheet N002372", Aug. 2012, 1 page.

SMBSC, "What you need to know about Spray Adjuvants", www.smbsc.com/pdf/SprayAdjuvants.pdf, Accessed: Feb. 28, 2018, 5 pages.

Solvay, "AG 16098 DV 5-8135 Safety Data Sheet", Solvay, Apr. 26, 2016, 14 pages.

Solvay, "AG-RHOSPEC 7713 Material Safety Data Sheet", Sep. 13, 2013, 10 pages.

Winfield Interlock, "Safety Data Sheet", Oct. 1, 2013, 5 pages.

Yuan, et al., "Predicting the Temperature Dependent Viscosity of Biodiesel Fuels", Fuel, vol. 88, pp. 1120-1126, 2009, Elsevier.

* cited by examiner

MULTIFUNCTIONAL AGRICULTURAL ADJUVANT COMPOSITIONS

CROSS-REFERENCE RELATED APPLICATIONS

This application claims priority to U.S. Provisional Application No. 62/796,236, filed on Jan. 24, 2019, the entire contents of which are incorporated herein by reference.

BACKGROUND

Agricultural sprays often include agricultural adjuvant compositions configured and selected to aid or contribute to the effectiveness of the agricultural sprays. For example, adjuvants may be configured and selected to decrease the number of driftable droplets formed when dispensing the agricultural sprays from one or more nozzles. Some agricultural adjuvant compositions include ammonium sulfate ("AMS") dissolved in water. Such agricultural adjuvant compositions that include AMS dissolved in water are limited by the quantity of AMS that can be dissolved in water. For example, the amount of AMS that is dissolvable in water at 0° C. is 41 weight percent ("wt. %") and, thus, such agricultural adjuvant compositions that include AMS dissolved in water typically include less than 38 wt. % AMS to prevent AMS coming out of solution (e.g., AMS coming out of solution may form large particles of AMS that are difficult to dissolve). Further, such agricultural adjuvant compositions that include AMS dissolved in water are limited because water is an inactive ingredient (e.g., does not aid or contribute to the effectiveness of the agricultural spray).

Users and producers of agricultural adjuvant compositions continue to seek new and improved adjuvants.

SUMMARY

In an embodiment, a multifunctional agricultural adjuvant composition is disclosed. The multifunctional agricultural adjuvant composition includes one or more liquid components comprising methylated seed oil. The multifunctional agricultural adjuvant composition also includes one or more ammonium sulfate particles dispersed in the one or more liquid components. Further, the multifunctional agricultural adjuvant composition includes one or more surfactants. The one or more surfactants exhibit a hydrophilic-lipophilic balance of about 4 to 9 or 16 to about 30. The one or more surfactants are free of non-ionic surfactants. The multifunctional agricultural adjuvant composition is at least two of a water conditioner, a surfactant, a high surfactant oil concentrate, a crop oil concentrate, a drift reduction and deposition adjuvant, a buffer, an acidifier, a nitrogen source, a compatibility agent, a basic blend, an adjuvant plus foliar fertilizer, a micronutrient, a macronutrient, a defoamer, an antifoam, a marker, a tank cleaner, or a utility adjuvant.

In some embodiments, at least one of the one or more surfactants exhibits a hydrophilic-lipophilic balance of about 4 to 9.

In some embodiments, at least one of the one or more surfactants exhibits a hydrophilic-lipophilic balance of 16 to about 30.

In some embodiments, the one or more surfactants comprise one or more ionic surfactants.

In some embodiments, the one or more surfactants comprise one or more amphoteric surfactants.

In an embodiment, a multifunctional agricultural adjuvant composition is disclosed. The multifunctional agricultural adjuvant composition includes one or more liquid components. The one or more liquid components comprise methylated seed oil. The multifunctional agricultural adjuvant composition also includes one or more solid agricultural particles dispersed in the one or more liquid components. The one or more solid agricultural particles form about 0.5 weight percent to about 99 weight percent of the multifunctional agricultural adjuvant composition. The multifunctional agricultural adjuvant composition exhibits one or more desired functions.

In some embodiments, the one or more liquid components comprise at least one of petroleum oil, vegetable oil, seed oil, paraffin oil, paraffinic oil, mineral oil, naphthenic oil, aromatic oil, petroleum distillates, ethylated seed oil, propylated seed oil, or butylated seed oil.

In some embodiments, one or more solid agricultural particles comprise ammonium sulfate.

In some embodiments, the ammonium sulfate forms greater than 41 weight percent of the multifunctional agricultural adjuvant composition at room temperature.

In some embodiments, the one or more solid agricultural particles comprise at least one sodium citrate, dipotassium phosphate, monoethanolamine sulfate, triethanolamine sulfate, itaconic acid, or one or more polyphosphates.

In some embodiments, the multifunctional agricultural composition further comprises one or more surfactants.

In some embodiments, the one or more surfactants comprises at least one of one or more ionic surfactants or one or more amphoteric surfactants.

In some embodiments, at least one of the one or more surfactants exhibits a hydrophilic-lipophilic balance of about 4 to 9.

In some embodiments, the multifunctional agricultural adjuvant composition further comprises at least one rheology modifier.

In some embodiments, the multifunctional agricultural adjuvant composition further comprises one or more antifoams, one or more structuring agents, one or more soluble pesticides that are soluble in the one or more liquid components, or one or more soluble solid agricultural particles that are soluble in the one or more liquid components.

In some embodiments, the one or more liquid components are substantially water free.

In some embodiments, the multifunctional agricultural adjuvant composition further comprises one or more water-sensitive chemicals, wherein each of the one or more water-sensitive chemicals are in an initial state.

In some embodiments, the multifunctional agricultural adjuvant composition is at least one of a water conditioner or a drift reduction and deposition adjuvant.

In some embodiments, the multifunctional agricultural adjuvant composition is at least one of a surfactant, a high surfactant oil concentrate, or a crop oil concentrate.

In an embodiment, an agricultural spray is disclosed. The agricultural spray comprises water, at least one pesticide or fertilizer, and a multifunctional agricultural adjuvant disposed therein. The multifunctional agricultural adjuvant comprises one or more liquid components comprising methylated seed oil and one or more solid agricultural particles at least partially dissolved in the water.

In an embodiment, a multifunctional agricultural adjuvant composition is disclosed. The multifunctional agricultural adjuvant composition comprises one or more liquid components. The one or more liquid components comprise methylated seed oil. The multifunctional agricultural adjuvant composition also includes one or more ammonium sulfate particles dispersed in the one or more liquid components. The one or more solid agricultural particles forms greater than 41 weight percent of the multifunctional agricultural adjuvant composition at room temperature and exhibits an average particle size that is less than 500 pmn. The multifunctional agricultural adjuvant composition also includes one or more surfactants.

Features from any of the disclosed embodiments may be used combined with one another, without limitation. In addition, other features and advantages of the present disclosure will become apparent to those of ordinary skill in the art through consideration of this detailed description.

BRIEF DESCRIPTION OF THE DRAWINGS

The drawings illustrate several embodiments of the present disclosure, wherein identical reference numerals refer to identical or similar elements or features in different views or embodiments shown in the drawings.

DETAILED DESCRIPTION

Figure 1:
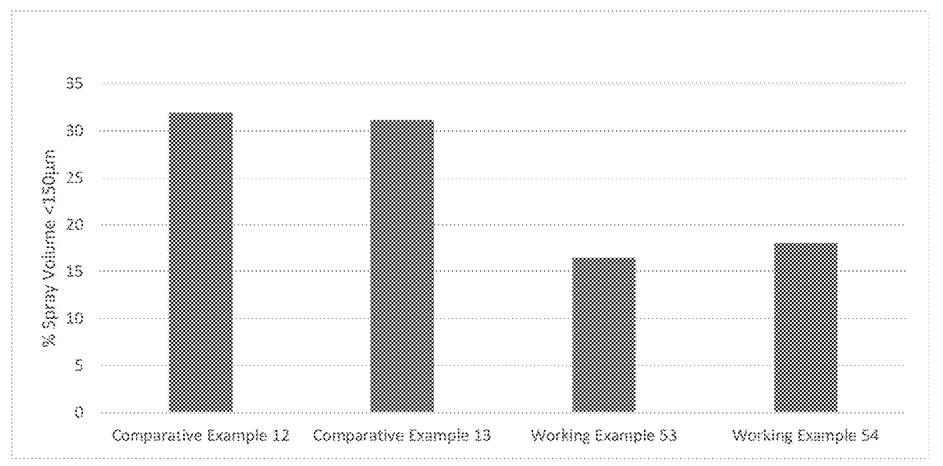
The FIGURE is a graph combining the information from testing Working Examples 53 and 54 and Comparative Examples 12 and 13.

Multifunctional agricultural adjuvant compositions ("MAACs") are disclosed herein. An example MAAC includes at least one liquid component and one or more solid agricultural particles dispersed in the liquid component. In other words, the MAAC is at least one of a suspension, dispersion, or slurry of the solid agricultural particles in the liquid component. The liquid component includes at least one methylated seed oil ("MSO") and the solid agricultural particles form about 0.5 wt. % to about 99 wt. % of the MAAC such that the adjuvant is an oil dispersion ("OD"). Examples of the solid agricultural particles includes AMS, one or more non-AMS water conditioners, amino acids, other organic chemicals, or other polymers. The MAAC exhibits one or more desired functions depending on the quantity and composition of the liquid component, the quantity and composition of the solid agricultural particles, and, optionally, adding one or more surfactants and/or one or more additional components (e.g., rheology modifiers) to the MAAC. The desired functions of the MAAC may include at least one of water conditioner, surfactant, high surfactant oil concentrate, crop oil concentrate, or drift reduction and deposition adjuvant.

Solid agricultural particles have been used in some agricultural adjuvant compositions (e.g., non-MAAC agricultural adjuvant compositions). For example, solid agricultural particles have been used in non-MAAC agricultural adjuvant compositions that consist of or consist essentially only of (e.g., forms greater than 90 wt. % of the non-MAAC agricultural adjuvant composition) the solid agricultural particles or include the solid agricultural particles dissolved in a liquid (e.g., water). However, the non-MAAC agricultural adjuvant compositions exhibit several disadvantages. For example, the non-MAAC agricultural adjuvant compositions that consist of or consist essentially only of solid agricultural particles are susceptible to becoming airborne due to the small particle size of the solid agricultural particles. The airborne solid agricultural particles increase the risk of exposure of the solid agricultural particles which may create a health hazard. For instance, AMS is hazardous in case of skin contact, eye contact, ingestion, or inhalation; the risk of each of which is increased when AMS becomes airborne. Further, the quantity and composition of the solid agricultural particles in non-MAAC agricultural adjuvants compositions that are dissolved in a liquid are limited by the solubility of the solid agricultural particle in liquid. For example, allowing the solid agricultural particles to recrystallize from the liquid may adversely increase the particle size of the non-MAAC solid agricultural particles.

However, the MAACs disclosed herein represent an improvement over the non-MAAC agricultural adjuvant compositions that consist of or consist essentially only of the solid agricultural particles or include the solid agricultural particles dissolved in a liquid. For example, as previously discussed, the MAACs disclosed herein include the solid agricultural particles dispersed in the liquid components. Dispersing the solid agricultural particles in the liquid component prevents or inhibits the solid agricultural particles from becoming airborne. Further, the MAACs disclosed herein may include a greater quantity of solid agricultural particles, a greater variety of compositions of the solid agricultural particles, and a greater variety of the composition of the liquid component than the non-MAAC agricultural adjuvant compositions that include the solid agricultural particles dissolved in a liquid since the solubility of the solid agricultural particles in the liquid does not matter. The greater quantity of solid agricultural particles, a greater variety of compositions of the solid agricultural particles, and a greater variety of the composition of the liquid component in the MAAC than the non-MAAC agricultural adjuvant compositions allows the MAAC to exhibit more functions than the non-MAAC agricultural adjuvant composition. Further, the greater quantity of the solid agricultural particles in the MAAC may increase the concentration of the solid agricultural particles in the MAAC. The greater concentration of the MAAC decreases the volume of the MAAC compared to a substantially similar non-MAAC agricultural adjuvant composition (e.g., a non-MAAC agricultural adjuvant composition that includes the same quantity of solid agricultural particles dissolved in a liquid) which makes the MAAC more efficient to ship, handle, and store. Additionally, the greater concentration of the solid agricultural particles in the MAAC may decrease the volume of the MAAC added to an agricultural spray.

It is noted that any reference to the solubility and/or dispersibility of the solid agricultural particles in the liquid component refers to the solubility and/or dispersibility of the solid agricultural particles in the liquid components at 0° C. Further, any reference to the amount of the solid agricultural particles and/or other component (e.g., liquid components, surfactant, etc.) that may be include in the MAAC refers to the amount of solid agricultural particles and/or other components that may be included in the MAAC at 0° C.

Liquid Component

The liquid component is selected so at least one of the solid agricultural particles is at least partially dispersible (e.g., not soluble) in the liquid component. For example, the liquid component is selected so at least one of the solid agricultural particles is substantially insoluble in the liquid component (e.g., at most about 5 wt. % of the solid agricultural particles are dissolvable in the liquid component) or generally not dissolvable in the liquid component (e.g., at most about 25 wt. %, at most about 20 wt. %, at most about 15 wt. %, or at most 10 wt. % of the solid agricultural particles are dissolvable in the liquid component) to limit the affect recrystallization of the solid agricultural particles have on the particle size thereof. However, it is noted that the liquid component may be selected so at least a significant portion of the solid agricultural particles (e.g., more than about 25 wt. % or about 25 wt. % to about 50 wt. %) are dissolvable in the liquid component. As previously discussed, dispersing the solid agricultural particles in the liquid component may allow the MAAC to include at least one of a greater quantity of the solid agricultural particles or a wider variety of compositions of the solid agricultural particles than a substantially similar non-MAAC agricultural adjuvant composition that includes a liquid (e.g., water) selected to dissolve at least substantially all of the solid agricultural particles. Allowing the MAAC to include at least one of a greater quantity of the solid agricultural particles or a wider variety of compositions of the solid agricultural particles than a substantially similar non-MAAC agricultural adjuvant composition may at least one of decrease the volume of the MAAC, increase the concentration of one or more solid agricultural particles in the MAAC, or allow the MAAC to exhibit one or more desired functions.

In an embodiment, the liquid component may be an oil and the composition may be an OD. The oil may include or consist of MSO. MSO has a different classification in the art than other oils because MSO has several properties that are different than the other oils (e.g., petroleum distillates, corn oil, coconut oil, cotton seed oil, soybean oil, polyoxyethylated castor oil, cod liver oil, epoxidized linseed oil, fish oil, mineral oils, sperm oil, tall oil, wintergreen oil, rapeseed oil, ethylated seed oil, propylated seed oil, butylated seed oil, petroleum oil, other oils derived from plants and animals, other seed oils, paraffin oil, etc.). The different properties of MSO may improve the MAAC that includes MSO compared to a substantially similar non-MAAC agricultural adjuvant compositions that do not include MSO. In an example, unlike some oils, MSO is an agricultural adjuvant by itself. Including MSO in the MAAC may cause the MAAC to include a higher concentration of active ingredients (e.g., aids or contributes to the effectiveness of an agricultural spray) since MSO may be an active ingredient by itself. The higher concentration of active ingredients may decrease the volume of the MAAC and/or decrease the quantity of the MAAC added to an agricultural spray compared to the non-MAAC agricultural adjuvant compositions that do not include MSO. In an example, MSO can increase the uptake of active ingredients into plants. In an example, MSO can disperse a wider variety of solid agricultural particles without dissolving the solid agricultural particles. For instance, MSO can disperse AMS therein without dissolving significant quantities of AMS. The ability of the MSO to disperse a wider variety of solid agricultural particles without dissolving the solid agricultural particles allows the MAAC to include a higher concentration of solid agricultural particles and allows the MAAC to include a wider variety of solid agricultural particles than a substantially similar non-MAAC agricultural adjuvant composition that does not include MSO. It is noted that at least some other organic solvents may disperse a variety of solid agricultural particles without dissolving the solid agricultural particles, depending on the composition of the solid agricultural particles. In an example, MSO may be used with a wide variety of components. For instance, MSO may be used with a wide variety of surfactants, such as surfactants exhibiting a wide range of viscosities, hydrophilic-lipophilic balance, compositions, etc. In particular, unlike some of the other oils mentioned above, MSO allows the MAACs disclosed herein to include ionic surfactants and/or amphoteric surfactants in addition to or instead of non-ionic surfactants. Further, unlike some of the other oils mentioned above, MSO allows the MAACs disclosed herein to include surfactants exhibiting a hydrophilic-lipophilic balance ("HLB") of about 4 to 9 or surfactants exhibiting an HLB of 16 to about 30 instead of being limited to surfactants exhibiting an HLB of 10 to 15. In an example, unlike some oils, the MAAC may remain stable (e.g., the solid agricultural particles may not precipitate from the liquid component at room temperature for a selected period of time) regardless of the viscosity of the MSO. For instance, MAAC may remain stable when MSO exhibits a viscosity of about 5.8 centipoise (cP) at 25° C. and about 5.3 cP at 40° C. Further, MSO may positively impact spray application because MSO may facilitate active ingredient (AI) penetration to a target through humectancy, improve adhesion, increase spray coverage, dissolve waxy leaf cuticle, acts as a drift reduction technology (e.g., improves deposition, reduces physical particle spray drift, and reduces bounce of droplets impacting the leaf surface), optimizes performance of pesticides in low humidity, optimizes performance of pesticides in drought stress, optimizes performance of pesticides with larger weeds, and solubilizes herbicides that are less water soluble.

Further, the liquid component may include MSO because MSO is widely available. The wide availability of MSO may improve the manufacture of the MAAC that includes MSO since, unlike some oils, supply bottlenecks or lack of supply are unlikely to create manufacturing delays.

In an embodiment, the liquid component may include one or more non-MSO oils instead of or in addition to the MSO. In an example, the one or more non-MSO oils may include one or more modified seed oils, such as ethylated seed oils, propylated seed oils, or butylated seed oils. In an example, the one or more non-MSO oils may include one or more non-alkylated oils, such as petroleum distillates, petroleum oil, vegetable oil (e.g., corn oil, coconut oil, or soybean oil), other seed oils (e.g., cotton seed oils, linseed oil, or rapeseed oil), paraffin oil, paraffinic oil, mineral oil, naphthenic oil, aromatic oils, petroleum distillates, hydrocarbons, or any other oil. It is noted that some of the non-MSO oils disclosed herein may exhibit some of the benefits of MSO. In an embodiment, the liquid component may include a nonpolar liquid. In an embodiment, the liquid component may include a non-oil liquid, such as an alcohol or water. In an embodiment, the liquid component may be substantially water free (e.g., the liquid component includes less than about 5 wt. % water, less than 2 wt. % water, or less than 1 wt. % water).

Solid Agricultural Particles

The solid agricultural particles may include any particles that are solid and can be dispersed in the liquid component. For example, the solid agricultural particles may include at least one of one or more water conditioners, one or more organic acids, one or more pesticides (e.g., herbicide, fungicide, insecticide, rodenticide, bactericide, larvicide, nematocide, etc.), one or more micronutrients (e.g., Zn, Mn, B, Cu, Mo, Co, Cl, Na, etc.), one or more macronutrients (e.g., N, P, K, etc.), one or more secondary macronutrients (e.g., S, Ca, Mg, etc.), one or more spores, one or more microorganisms (e.g., bacteria, etc.), one or more inoculants, one or more plant growth regulators, one or more water-sensitive components (e.g., water-activated compositions or water-inactivated compositions), one or more amino acids, or other adjuvant compositions.

In an embodiment, the solid agricultural particles may include at least one water conditioner. Water conditioners are used with hard water to at least one of reduce the interaction of dissolved solids with the active ingredients or inhibit a decrease in efficacy of pesticides and/or micronutrients in hard water, either of which can decrease an agricultural spray's performance. Further, water conditions (such as AMS) may help with uptake of certain active ingredients into a plant. In an example, the at least one water conditioner may include AMS. As previously discussed, AMS has been used in non-MAAC agricultural adjuvant compositions. However, using AMS in the non-MAAC agricultural adjuvant compositions has been limited due to health hazards associated with using dried AMS and the limited solubility of AMS in water (41 wt. % at 0° C.). Nevertheless, dispersing AMS in the liquid component solves the aforementioned problems with AMS. For example, the liquid component prevents AMS from becoming airborne which makes AMS safer to handle (e.g., limits inhalation, ingestion, and skin contact) and makes the limited solubility of AMS in water a non-issue. For instance, the AMS may form 42 wt. % to about 99 wt. %, 42 wt. % to about 90 wt. %, 45 wt. % to about 65 wt. %, about 55 wt. % to about 75 wt. %, about 65 wt. % to about 85 wt. %, or about 75 wt. % to about 90 wt. % of the MAAC. When used as a water conditioner, AMS associates with hard water ions and provides ammonium ions for improved uptake.

In an example, the at least one water conditioner may include at least one non-AMS water conditioner instead of or in addition to AMS. Examples of non-AMS water conditioners includes sodium citrate, dipotassium phosphate, monoethanolamine sulfate, triethanolamine sulfate, itaconic acid, polyphosphates, organic acids or salts thereof, amino acids, phosphonates, Lewis bases (e.g., monoethanolamine), synthetic compounds (e.g., ethylenediaminetetraacetic acid, ethylenediamine-N,N'-bis, nitrilotriacetic acid, diethylenetriamine pentaacetate, ethylenediamine-N,N'-disuccinic acid, methylglycinediacetic acid, or ethylenediamine-N,N'-bis (2-hydroxyphenylacetic acid)), polymerized amino acids and/or phosphonates, or other suitable polymer.

In an embodiment, as previously discussed, the solid agricultural particles may include one or more organic acids. The organic acids that may form at least a portion of the solid agricultural particles may include at least one of propionic acid, valeric acid, caproic acid, benzoic acid, carbonic acid, acetic acid, butyric acid, formic acid, maleic acid, oleic acid, oxalic acid, stearic acid, tartaric acid, uric acid, citric acid, gluconic acid, lactic acid, malonic acid, tartaric acid, glutamic acid, fumaric acid, oleic acid, glutaric acid, malic acid, or ascorbic acid. It is noted that the organic acids may also act as a water conditioner.

The solid agricultural particles may be selected to be at least partially dissolved when added to the agricultural spray. For example, the agricultural spray may include water and the solid agricultural particles may exhibit at least some solubility in water. Dissolving the solid agricultural particles in the agricultural spray may prevent the solid agricultural particles from clogging the nozzles that dispense the agricultural spray and may facilitate uniformly distributing the solid agricultural particles in the agricultural sprays. In an embodiment, the solid agricultural particles may be selected and configured to exhibit rapid dissolution in the agricultural spray (e.g., water). For example, the solid agricultural particles disclosed herein may dissolve more rapidly in the agricultural spray than a non-MAAC agricultural adjuvant composition that consists of solid agricultural particles due to the liquid component. Rapid dissolution of the solid agricultural particles may decrease the amount of mixing and time required to dissolve the solid agricultural particles in the agricultural spray. The solid agricultural particles may exhibit rapid dissolution in the agricultural spray when the solid agricultural particles exhibit a high surface area. For example, the solid agricultural particles may exhibit a surface area of at least about 15 $cm^2/g$, such in ranges of about 15 $cm^2/g$ to about 150 $cm^2/g$, about 100 $cm^2/g$ to about 1,000 $cm^2/g$, about 150 $cm^2/g$ to about 1,500 $cm^2/g$, about 1,000 $cm^2/g$ to about 10,000 $cm^2/g$, about 1,500 $cm^2/g$ to about 15,000 $cm^2/g$, or about 10,000 $cm^2/g$ to about 50,000 $cm^2/g$.

In an embodiment, the solid agricultural particles may be selected and configured to exhibit a relatively small average particle size. The relatively small average particle size of the solid agricultural particles may facilitate dispersion of the solid agricultural particles in the liquid component and increase the surface area of the solid agricultural particles. In an example, the relatively small average particle size of the solid agricultural particles may be less than about 500 μm, less than about 400 μm, less than about 200 μm, such as less than about 150 μm, less than about 100 μm, less than about 50 μm, less than about 25 μm, less than about 10 μm, less than about 5 μm, less than about 1 μm, less than about 500 nm, or in ranges of about 500 nm to about 5 μm, about 1 μm to about 10 μm, about 5 μm to about 25 μm, about 10 μm to about 50 μm, about 25 μm to about 100 μm, about 50 μm to about 200 μm, about 100 μm to about 300 μm, about 200 μm to about 400 μm, about 300 μm to about 450 μm, or about 350 μm to about 500 μm.

The solid agricultural particles may be processed to exhibit any of the surface areas and/or particle sized disclosed herein. In an embodiment, processing the solid agricultural particles may include grinding the solid agricultural particles to increase the surface area and decrease the average particle size of the solid agricultural particles. Examples of grinding the solid agricultural particles may include a dry or wet grinding process. The dry grinding process may include using a blender, a hammer mill, a pin mill, a media mill (e.g., ball mill or ajar mill), or a media-less mill (e.g., a jet mill or an air mill). The wet grinding process may include a blending, a wet media mill, or a wet media-less mill (e.g., a homogenizer, a high shear mill, or a bearing). In an embodiment, processing the solid agricultural particles may include a non-grinding process, such as precipitation, spray drying, freeze drying, other mechanical processes, or other chemical process.

Surfactants

In some embodiments, the MAAC may include at least one surfactant (e.g., dispersant) that is distinct from the liquid component and the solid agricultural particles. The surfactant may be selected and configured to substantially uniformly disperse the solid agricultural particles in the liquid component or more uniformly disperse the solid agricultural particles in the liquid component than if the MAAC did not include the surfactant. For example, the MAAC may include at least one surfactant when the solid agricultural particles are not dispersible in the liquid component (e.g., the solid agricultural particles form agglomerates in the liquid component) or to improve the dispensability of the solid agricultural particles in the liquid component even when the solid agricultural particles are dispersible in the liquid component. The surfactant may also be selected to disperse the liquid component (e.g., an oil) in the agricultural spray. In an embodiment, the MAAC does not include at least one surfactant, such as when the solid agricultural particles are at least partially dispersible in the liquid component without the surfactant.

Dispersing the solid agricultural particles in the liquid component may inhibit or prevent the solid agricultural particles from at least one forming agglomerates of the solid agricultural particles in the liquid component. The agglomerates of the solid agricultural particles may prevent rapid dissolution of the solid agricultural particles in the agricultural spray and/or may clog the nozzles dispensing the agricultural spray. Further, dispersing the solid agricultural particles in the liquid component may inhibit or prevent the solid agricultural particles from precipitating, settling, packing (e.g., forming a dense layer of the solid agricultural particles at the bottom of a container that includes the MAAC), or otherwise separating from the liquid component. Precipitating, settling, packing, or otherwise separating the solid agricultural particles may cause the solid agricultural particles to remain in a container that held the MAAC after the MAAC is removed from the container. In an example, the surfactant may also be selected to disperse the liquid component (e.g., an oil) in the agricultural spray.

Unlike some non-MAAC agricultural adjuvant compositions, the MAAC may include any surfactant that can disperse the solid agricultural particles in the liquid component, without limitation. In an example, the surfactant may include at least one non-ionic surfactant, such as nonyl phenol ethoxylates, or alkyl polyglycosides. As used herein, the non-ionic surfactant does not include MSO. In an example, the surfactant may include at least one surfactant that is not a non-ionic surfactant instead of the non-ionic surfactant (e.g., the MAAC is free of non-ionic surfactants) or in addition to the non-ionic surfactant. The MAAC may include the surfactant that is not a non-ionic surfactant because the MAAC may include MSO and the MAAC may exhibit a variety of functions. An example of the surfactant that may be included in the MAAC that is not a non-ionic surfactant includes at least one ionic surfactant, such as sodium lauryl ether sulfate. An example of a surfactant that may be included in the MAAC that is not a non-ionic surface includes at least one amphoteric surfactant, such as cocamidopropyl betaine.

The surfactant may exhibit any hydrophilic-lipophilic balance ("HLB"). In an example, the surfactant may exhibit an HLB (e.g., calculated, estimated, or measured HLB) of about 4 to about 30, such as in ranges of about 4 to about 6, about 5 to about 7, about 6 to about 8, about 7 to about 9, about 8 to about 10, about 9 to about 11, about 10 to about 12, about 11 to about 13, about 12 to about 14, about 23 to about 15, about 14 to about 16, about 15 to about 17, about 16 to about 18, about 17 to about 19, about 18 to about 20, about 19 to about 21, about 20 to about 23, about 22 to about 25, about 24 to about 27, or about 26 to about 30. In an embodiment, the surfactant may exhibit an HLB that is greater than 30. This is in contrast to U.S. Pat. No. 6,423,667, which discloses the use of a non-ionic surfactant with a HLB of 10-15. The surfactants of the present disclosure exhibit an HLB of less than 10 (e.g., 4 to 9) or an HLB greater than 15 (e.g., 16 to 30), unlike the composition disclosed in U.S. Pat. No. 6,423,667, because the MAAC includes MSO, the MAAC may exhibit a variety of functions, and in order to provide a composition with specific dissolution characteristics when added to water. Surfactants exhibiting an HLB of about 4 to 9 are more likely to be hydrophobic than surfactants exhibiting an HLB greater than 10 while surfactants exhibiting an HLB of 16 to about 30 are more likely to by hydrophilic than surfactants exhibiting an HLB less than 15. The HLB of the surfactant that is included in the MAAC may depend on the selected function of the MAAC since the properties of the surfactant and, by extension how the surfactant facilitates the function of the MAAC, may depend on the HLB of the surfactant. For example, the MAACs disclosed herein may include a surfactant exhibiting an HLB of about 4 to 9 when an oil-soluble surfactant is desirable or when it is desirable for the surfactant to act as a water-in-oil emulsifying agent or a wetting agent. For example, the MAACs disclosed herein may include a surfactant exhibiting an HLB of 16 to 30 when a water-soluble surfactant is desirable or when it is desirable for the surfactant to act as an oil-in-water emulsifying agent or a stabilizing agent.

The need for the MAAC to include at least one surfactant and/or the quantity of the surfactant included in the MAAC may depend on several factors. In an example, the need for and the quantity of the at least one surfactant can depend on the ability of the solid agricultural particles to be dispersed in the liquid component when the MAAC includes no surfactant. For instance, the MAAC may include no surfactant or a relatively small quantity of the surfactant when the solid agricultural particles can be at least partially dispersed in the liquid component when the MAAC includes no surfactant or may include a relatively large quantity of the surfactant when the solid agricultural particles form agglomerates in the liquid component when the MAAC includes no surfactant. In an example, the need for and the quantity of the at least one surfactant can depend on the average particle size of the solid agricultural particles. For instance, decreasing the average particle size of the solid agricultural particles may decrease the need for and/or the quantity of the surfactant included in the MAAC. In an example, the need for and the quantity of the surfactant can depend on the viscosity of the MAAC. For instance, increasing the viscosity of the MAAC can decrease the need for and/or the quantity of the surfactant in the MAAC. MAACs that are solids, pastes, or viscous liquids (e.g., viscous suspensions, emulsions, etc.) may not need a surfactant or may only need a small quantity of surfactant relative to MAACs that are less viscous liquids.

Additional Components

The MAAC may include one or more additional components therein in addition to the liquid component, the solid agricultural particles, and, optionally, the surfactants. For example, the MAAC may include one or more emulsifiers, rheology modifiers, antifoam compositions, pesticides soluble in the liquid component, active ingredients soluble in the liquid component, other solid agricultural particles soluble in the liquid component, or water-activated compositions. The pesticide, active ingredients, and/or the solid agricultural particles are soluble in the liquid component when at least about 50 wt. %, at least about 75 wt. %, or about 100 wt. % of the pesticide, active ingredient, and/or the solid agricultural particles dissolve in the liquid component.

In an embodiment, the MAAC may include one or more rheology modifiers selected to affect the average droplet size of the agricultural spray dispensed from a nozzle. For example, dispensing the agricultural spray from a nozzle may form small droplets (e.g., droplets exhibiting a diameter that is less than 150 µm) which are susceptible to off-target drift. The rheology modifier added to the MAAC may be selected to decrease the number of small droplets formed. However, it is noted that adding the rheology modifier to the MAAC may increase the number of ultra-coarse droplets (e.g., droplets exhibiting a diameter that is greater than 622 µm) which may decrease the coverage of the agricultural spray. To counteract the increase number of ultra-coarse droplets, the MAAC may also include a perforation-aid type adjuvant (e.g., MSO or other oils). In an embodiment, the one or more rheology modifiers may be added to improve the stability of the MAAC.

The rheology modifiers added to the MAAC may include but are not limited to: polymers, Newtonian-responding polymers (e.g., polyacrylamide), monosaccharides, polysaccharides (e.g., colloidal polysaccharides, starches, vegetable gums, pectin), glucose, fructose, galactose, mannose, lactose, fructose, xylose, amylose, raffinose, maltotriose, glucosides, trehalose, saccharide alcohols (e.g., mannitol, sorbitol, xylitol and maltitol), compositions containing sugar (e.g., molasses and honey), guar gum (e.g., crop-based guar gum or modified guar gum), xanthan, cellulose, Locust bean, alginate, agar-agar, carrageenan, gum arabic, dimethylpolysiloxane, silica, and derivatives of and combinations thereof. In a more particular example, the rheology modifier includes guar gum, modified guar gum, and/or polyacrylamide since guar gum, modified guar gum, and/or polyacrylamide may be more effective at reducing the number of fine droplets and managing the number of ultra-coarse droplets compared to at least some of the other rheology modifiers disclosed herein.

The rheology modifier may be present in the MAAC in a range from about 0.25 to about 6.0% (v/v), about 0.25 to about 0.75% (v/v), about 0.5 to about 1.0% (v/v), about 0.75 to about 1.5% (v/v), about 0.5 to about 5% (v/v), about 0.5 to about 4.0% (v/v), about 0.5 to about 3.0% (v/v), about 0.5% to about 2.0% (v/v), about 1.0 to about 5.0% (v/v), about 1.0 to about 4.0% (v/v), about 1.0 to about 3.5% (v/v), or about 1.0 to about 3.25% (v/v), about 1.0 to about 3.0% (v/v), about 1.0 to about 2.75% (v/v), about 1.25 to about 4.5% (v/v), about 1.5 to about 4.0% (v/v), about 2.0 to about 4.0% (v/v), about 2.0 to about 4.0% (v/v), up to about 6% (v/v), up to about 5.0% (v/v), up to about 4.0% (v/v), up to about 3.5% (v/v), up to about 3.0% (v/v), or up to about 2.0% (v/v) of the adjuvant. Alternatively, the rheology modifier may be present in the MAAC at any range of the aforementioned levels (e.g., about 1.25 to about 2.75% (v/v)). Regarding the MAAC, the rheology modifier may be present in a range from about 0.0025 to about 0.08 g/ml, about 0.0025 to about 0.0075 g/ml, about 0.005 to about 0.01 g/ml, about 0.0075 to about 0.015 g/ml, about 0.0005 to about 0.065 g/ml, about 0.0005 to about 0.05 g/ml, about 0.0005 to about 0.04 g/ml, about 0.0005 to about 0.04 g/ml, about 0.0005 to about 0.02 g/ml, about 0.01 to about 0.065 g/ml, about 0.01 to about 0.06 g/ml, about 0.01 to about 0.05 g/ml, about 0.01 to about 0.04 g/m, about 0.01 to about 0.03 g/ml, about 0.02 to about 0.04 g/ml, about 0.03 to about 0.05 g/ml, about 0.04 to about 0.06 g/ml, about 0.05 to about 0.075 g/ml, less than about 0.0025 g/ml or greater than about 0.08 g/ml. The amount of the rheology modifiers that are present in the MAAC may depend on the type of rheology modifier, the purpose of the rheology modifier, or type of drift reduction technology used (e.g., polymer vs. emulsion).

In an embodiment, regarding agricultural sprays including the rheology modifier-containing MAAC (e.g., tank-mixed), the rheology modifier may be present in a range from about 0.001 to about 0.040% (v/v), about 0.001 to about 0.003% (v/v), about 0.002 to about 0.004% (v/v), about 0.003 to about 0.005% (v/v), about 0.0045 to about 0.036% (v/v), about 0.0045 to about 0.032% (v/v), about 0.006 to about 0.030% (v/v), about 0.008 to about 0.025% (v/v), about 0.009 to about 0.020% (v/v), about 0.009 to about 0.016% (v/v), about 0.009 to about 0.014% (v/v), about 0.009 to about 0.013% (v/v), about 0.009 to about 0.011% (v/v), up to about 0.040% (v/v), up to about 0.035% (v/v), up to about 0.032% (v/v), up to about 0.030% (v/v), up to about 0.025% (v/v), up to about 0.020% (v/v), or up to about 0.016% (v/v) of the agricultural spray. Alternatively, the rheology modifier may be present in the agricultural spray at any integer range of the aforementioned levels (e.g., about 0.009 to about 0.032 (v/v)). With respect to agricultural sprays including the rheology modifier-containing MAAC, the rheology modifier may be present in a range from $0.2 \times 10^{-4}$ to about $5 \times 10^{-4}$ g/ml, about $0.2 \times 10^{-4}$ to about $0.5 \times 10^{-4}$ g/ml, about $0.4 \times 10^{-4}$ to about $0.7 \times 10^{-4}$ g/ml, about $0.5 \times 10^{-4}$ to about $1 \times 10^{-4}$ g/ml, about $0.7 \times 10^{-4}$ to about $1.5 \times 10^{-4}$ g/ml, about $0.5 \times 10^{-4}$ to about $3 \times 10^{-4}$ g/ml, about $0.5 \times 10^{-4}$ to about $2 \times 10^{-4}$ g/ml, about $1.0 \times 10^{-4}$ to about $1.4 \times 10^{-4}$ g/ml, about $1.2 \times 10^{-4}$ to about $1.5 \times 10^{-4}$ g/ml, about $1.4 \times 10^{-4}$ to about $1.7 \times 10^{-4}$ g/ml, about $1.5 \times 10^{-4}$ to about $2.0 \times 10^{-4}$ g/ml, about $1.7 \times 10^{-4}$ to about $2.2 \times 10^{-4}$ g/ml, about $2.0 \times 10^{-4}$ to about $2.6 \times 10^{-4}$ g/ml, $2.2 \times 10^{-4}$ to about $2.7 \times 10^{-4}$ g/ml, about $2.6 \times 10^{-4}$ to about $3 \times 10^{-4}$ g/ml, less than about $0.2 \times 10^{-4}$ g/ml or greater than $5 \times 10^{-4}$ g/ml. The amount of the rheology modifiers that are present in agricultural sprays including the rheology modifier-containing MAAC may depend on the type of rheology modifier, the purpose of the rheology modifier, or type of drift reduction technology used (e.g., polymer vs. emulsion).

The quantity of the rheology modifier in the MAAC or agricultural spray can be selected to at least one of reduce the number of fine droplets and/or manage the number of the ultra-coarse droplets. The quantity of the rheology modifier can be selected based on the desired number of fine droplets and/or ultra-coarse droplets. Typically, increasing the quantity of the rheology modifier decreases the number of fine droplets and increases the number of ultra-coarse droplets. The quantity of the rheology modifier can also be selected based on the quantity of the perforation-aid type adjuvant that mixed with the rheology modifier. For example, typically, increasing the quantity of the perforation-aid type adjuvant decreases the number of ultra-coarse droplets allowing for an increased quantity of the rheology modifier. However, the rheology modifier combined with the perforation-aid type adjuvant can have certain compositions (e.g., sweet spots) where increasing or decreasing the quantity of the rheology modifier and/or the perforation-aid type adjuvant can increase the number of fine droplets and/or the number of ultra-coarse droplets. Additionally, the quantity of the rheology modifier can be selected based on the agricultural nozzle used to spray the MAAC or agricultural spray and the pesticide mixed with the MAAC.

Further examples of rheology modifiers and adjuvant compositions that include rheology modifiers are disclosed in U.S. patent application Ser. No. 15/857,145 filed on Dec. 28, 2017; U.S. patent application Ser. No. 16/023,790 filed on Jun. 29, 2018; and U.S. patent application Ser. No. 16/198,349 filed on Nov. 21, 2018; the disclosure of each of which is incorporated herein, in its entirety, by this reference. As previously discussed, the liquid component, and by extension the MAAC, may be water free. When the liquid component does not include water, the additional components of the MAAC may include at least one water-sensitive component (e.g., water-activated compositions, water-inactivated compositions, compositions that degrade or chemically react with water, etc.). Examples of the water-sensitive component may include spores, bacteria, 2,4-D herbicide, acifluorfen, atrazine, bromoxynil, chlorimuron, chlorsulfuron, clethodim, clomazone, cloransulam, fluazifop, flumioxazin, glufosinate, halosulfuron, lactofen, mesotrione, metsulfuron, pendimethalin, rimsulfuron, saflufenacil, sethoxydim, thifensulfuron. The water-sensitive component may be added to the MAAC while the water-sensitive component is in an initial state (e.g., dormant state for the water-activated component or an active state for the water-deactivated component). The water-sensitive component may be configured to switch to a secondary state (e.g., active state for the water-activated component or dormant state for the water-deactivated component) when the water-sensitive component is exposed to water, such as water present in an agricultural spray. In an embodiment, the water-sensitive component may exhibit a longer life span while the water-sensitive component is in the initial state than when the water-sensitive component is in the active state. Adding the water-sensitive component to an MAAC that does not include water may increase the shelf-life of a MAAC that includes the water-sensitive component compared to an MAAC that includes water.

In an embodiment, the additional components of the MAAC may include inert components that include but are not limited to: solvents (e.g., isopropyl alcohol and/or isobutyl alcohol), propylene glycol, a poly-siloxane foam retardant (Si), and silica (e.g., modified silica). These inert components may be at least one of one or more nonfunctioning agents, one or more surfactant additives, one or more structuring aids (e.g., silica) that provide additional structure to the MAAC to inhibit settling of the solid agricultural particles, and/or one or more formulation aids (e.g., for reducing the freezing temperature). The inert components may be present in a range from about 1 to about 30% (v/v) of the adjuvant composition. Other inert components may include one or more anti-foaming agents or defoamers, which may be present in the MAAC and may include but are not limited to silicone-based defoamers. These components may be present in a range from about 0.001 to about 1.0% (v/v) of the MAAC Antimicrobials, another category of inert components, may be present in the MAAC and may include 1,2-benzisothiazolin-3-one in dipropylene glycol-antimicrobial (e.g., Proxel™ GXL, available from Arch Biocides of Smyrna, Ga.) These components may be present in a range from about 0.01 to about 0.25% (v/v) of the MAAC.

In an embodiment, the additional components of the MAAC may include one or more pesticides (e.g., herbicides, insecticides, and/or fungicides). Some herbicides include glyphosate (e.g., N-(phosphonomethyl)glycine) in various forms including in a salt, ester or other derivative thereof. Examples of glyphosate products include: its form as a potassium salt (e.g., Roundup PowerMax® and Touchdown Total®), as a dimethylamine salt (e.g., Durango® DMA®), in its form as an isopropylamine salt (e.g., Cornerstone® 5 plus), and glyphosate combined with other pesticides such as 2,4-dichlorophenoxyacetic acid (2,4-D) (e.g., Enlist Duo™) and with dicamba (e.g., Roundup®% Xtend). Other herbicides include, but are not limited to: the sodium salt of bentazon (3-(1-methylethyl)-1H-2, 1,3-benzothiadiazin-4 (3H)-one 2,2-dioxide) (e.g., Basagran®), diglycolamine salt of 3,6-dichloro-o-anisic acid (e.g., Sterling® Blue); 3,6-dichloro-2-methoxybenzoic acid (e.g., Dicamba, Engenia™); diclycolamine salt of dicamba (e.g., XtendiMax), 2,4-dichlorophenoxyacetic acid (2,4-D), 1-chloro-3-ethyl amino-5-isopropylamino-2,4,6-triazine (Atrazine); amide herbicides; arsenical herbicides; carbamate and thiocarbamate herbicides; carboxylic acid herbicides; dinitroaniline herbicides, heterocyclic nitrogen-containing herbicides; organophosphate compounds; urea herbicides; and quaternary herbicides; 5-[2-chloro-4-(trifluoromethyl)phenoxy]-N-(methylsulfonyl)-2-nitrobenzamide (Fomesafen); tembotrione (e.g., Laudis®) in various forms including in the form of a salt, ester or other derivative thereof.

In addition or alternatively, the herbicides may include insecticides and/or fungicides. Insecticides that may be used with the disclosed drift reduction adjuvant compositions include but are not limited to: pyrethroid insecticides (e.g., bifenthrin); pyrethrins or other botanicals (e.g. D-limonene, linalool, ryania, rotenone, eugenol (clove oil); chloronicotinyls; essential oils (e.g., lemongrass, pepper wintergreen, rosemary, cinnamon, sesame, thyme, cedar oils and capsaicin); neem oil (e.g., Azadirachtin); nicotine; microbial products (e.g., *Bacillus thuringiensis* and *Beauveria bassiana*); oxadiazines (e.g., Indoxacarb); anthranilic diamide (e.g., chlorantraniliprole), juvenile hormone mimics (e.g., fenoxycarb, pyriproxifen, methoprene; and hydroprene), pyrroles (e.g., chlorfenapyr), phenylpyrazoles (e.g., fipronil), organophosphates (e.g., malathion and chlorpyrifos), inorganics (e.g., sulfur and dormant and horticultural oils), insect growth regulators such as chitin synthesis inhibitors (e.g., hexaflumuron; noviflumuron; diflubenzuron; buprofezin, cyromazine; and halofenozide); acaricides such as miticides (e.g., avermectin) and ixodicides alone or in any combination with the compositions of the present disclosure. Fungicides may include: fluxapyroxad, pyraclostrobin, propiconazole, trifloxystrobin, prothioconazole, 1,2-propanediols, azoxystrobin (e.g. Priaxor®, Onset®, Topaz®, Headline® AMP, Headline® SC, Stratego®, Quadris®).

Other pesticide additives may include nematicides, plant growth regulators, animal repellents, desiccants and defoliates.

Quantities of the Components of the MAAC

As previously discussed, the MAAC may include a wider range of quantities and compositions of components (e.g., liquid component, solid agricultural particles, surfactant, other additional components) than non-MAAC agricultural adjuvant compositions that include solid agricultural particles. For example, the MAAC may include a wider range of quantities and compositions of components because the solid agricultural particles are dispersed in the liquid component instead of dissolving the solid agricultural particles in a liquid.

The solid agricultural particles may form about 0.5 wt. % to about 99 wt. % of the MAAC. For example, the solid agricultural particles may form about 0.5 wt. % to about 2.5 wt. %, about 1 wt. % to about 5 wt. %, about 2.5 wt. % to about 7.5 wt. %, about 5 wt. % to about 10 wt. %, about 7.5 wt. % to about 15 wt. %, about 10 wt. % to about 20 wt. %, about 15 wt. % to about 25 wt. %, about 20 wt. % to about 30 wt. %, about 25 wt. % to about 30 wt. %, about 30 wt. % to about 40 wt. %, about 35 wt. % to about 45 wt. %, about 40 wt. % to about 50 wt. %, about 45 wt. % to about 60 wt. %, about 50 wt. % to about 70 wt. %, about 60 wt. % to about 80 wt. %, about 70 wt. % to about 90 wt. %, or about 80 wt. % to about 99 wt. % of the MAAC. In an embodiment, the quantity of the solid agricultural particles in the MAAC may be less than or greater than the solubility of the solid agricultural particles in water. For example, when the solid agricultural particles includes AMS, the quantity of AMS in the MAAC may be less than or greater than 42 wt. % or greater than 45 wt. %. In such an example, the MAAC may exhibit at least some functions of a non-MAAC agricultural adjuvant composition that includes AMS dissolved in water and/or at least some functions that the non-MAAC agricultural adjuvant composition that includes AMS dissolved in water cannot exhibit.

The quantity of solid agricultural particles dispersed in the liquid component may be selected based on several factors. In an example, as will be discussed in more detail below, the quantity of solid agricultural particles dispersed in the liquid component may depend on the desired function(s) of the MAAC. In an example, the quantity of solid agricultural particles dispersed in the liquid component may depend on the desired viscosity of the MAAC. For instance, the quantity of the solid agricultural particles may be relatively high (e.g., greater than about 50 wt. %, greater than about 70 wt. %, or greater than about 80 wt. %) when the desired viscosity of the MAAC is relatively high (e.g., the MAAC is a high viscosity liquid, a paste, or a solid) and the quantity of the solid agricultural particles may be relatively low (e.g., less than about 60 wt. %, less than about 50 wt. %, less than about 40 wt. %, less than about 30 wt. %, less than about 20 wt. %, or less than about 10 wt. %) when the desired viscosity of the MAAC is relatively low. In an example, the quantity of the solid agricultural particles in the MAAC may depend on the composition of the liquid component. For instance, the quantity of the solid agricultural particles in the MAAC may be lower when the liquid component is an active ingredient than when the liquid component is an inactive ingredient. In an example, the quantity of the solid agricultural particles in the MAAC may depend on the particle size of the solid agricultural particles.

The liquid component and the surfactant, collectively, may form about 1 wt. % to about 99.5 wt. % of the MAAC. For example, the liquid component and the surfactant, collectively, may form about 1 wt. % to about 15 wt. %, about 10 wt. % to about 20 wt. %, about 15 wt. % to about 25 wt. %, about 20 wt. % to about 30 wt. %, about 25 wt. % to about 35 wt. %, about 30 wt. % to about 40 wt. %, about 35 wt. % to about 45 wt. %, about 40 wt. % to about 50 wt. %, about 45 wt. % to about 60 wt. %, about 50 wt. % to about 70 wt. %, about 60 wt. % to about 80 wt. %, about 70 wt. % to about 90 wt. %, or about 80 wt. % to about 99.5 wt. % of the MAAC. The quantity of the liquid component and the surfactant present in the MAAC may depend on several factors. In an embodiment, the quantity of the liquid component and the surfactant form of the MAAC may depend on the quantity of the solid agricultural particles in the MAAC. For example, the liquid component and the surfactant may form a significant portion (e.g., at least 50 wt. %, more preferably at least 75 wt. %, or more preferably at least 90 wt. %) of the MAAC not occupied by the solid agricultural particles. In an embodiment, the quantity of the liquid component and the surfactant that form the MAAC may depend on the composition of the liquid component. For example, the liquid component may be an active ingredient (e.g., MSO) which may allow the MAAC to include a greater quantity of the liquid component than if the liquid component is an inactive ingredient.

In an embodiment, the liquid component may form at least about 0.5 wt. % of the liquid component and surfactant mixture, such as at least about 40 wt. %, at least about 50 wt. %, at least about 60 wt. %, at least about 70 wt. %, at least about 80 wt. %, at least about 90 wt. %, at least about 95 wt. %, at least about 99 wt. %, 100 wt. % (e.g., the liquid component and surfactant mixture only includes the liquid component), or in ranges of about 0.5 wt. % to about 50 wt. %, about 40 wt. % to about 60 wt. %, about 50 wt. % to about 70 wt. %, about 60 wt. % to about 80 wt. %, about 70 wt. % to about 90 wt. %, about 80 wt. % to about 95 wt. %, about 90 wt. % to about 99 wt. %, or about 95 wt. % to 100 wt. % of the liquid component and surfactant mixture. The quantity of the liquid component in the MAAC relative to the quantity of the surfactant in the MAAC may depend on several factors. In an example, the relative quantities of the liquid component and the surfactant may depend on the ability of the solid agricultural particles to be dispersed in the liquid component when the surfactant is not present. For example, the MAAC may include relatively more of the liquid component relative to the surfactant when the solid agricultural particles are easily dispersed in the liquid component without the surfactant compared to when the solid agricultural particles form agglomerates in the liquid component without the surfactant. In an example, the relative quantities of the liquid component and the surfactant may depend on the composition of the liquid component. For example, some liquid components (e.g., some non-MSO liquid components) may be restricted in the composition of the surfactant that may be mixed therewith. The restrictions in the composition of the surfactants may require the use of less effective surfactants which requires the MAAC to include relatively more surfactants than an MAAC that includes a liquid component that does not include the restrictions. In an example, the relative quantities of the liquid component and the surfactant may depend on the composition of the surfactant since some surfactants may be more effective at dispersing the solid agricultural particles in the liquid component (e.g., the MAAC requires less of the surfactant) than other surfactants.

The quantity of the additional elements optionally added to the MAAC may form at most about 50 wt. % of the MAAC, such as at most about 40 wt. %, at most about 30 wt. %, at most about 20 wt. %, at most about 10 wt. %, at most about 5 wt. %, at most about 1 wt. %, or in ranges of about 0.1 wt. % to about 1 wt. %, about 0.5 wt. % to about 5 wt. %, about 1 wt. % to about 10 wt. %, or about 20 wt. % to about 40 wt. The quantity of the additional elements may depend on the purpose of the additional elements, the desired function(s) of the MAAC, the composition and quantity of the solid agricultural particles in the MAAC, the composition and quantity of the liquid component in the MAAC, the quantity and composition of the surfactant, and application of the MAAC, method of spraying the MAAC, and/or the desired use rate of the MAAC.

Multiple Functions of the MAAC

The MAAC may exhibit multiple functions. For example, the MAAC may be at least one of a water conditioner, a surfactant, a high surfactant oil concentrate, a crop oil concentrate, a drift reduction and deposition adjuvant, a buffer, an acidifier, a nitrogen source, a compatibility agent, a basic blend, an adjuvant plus foliar fertilizer, a micronutrient, a macronutrient, or a scent. For example, the MAAC may be at least two of a water conditioner, a surfactant, a high surfactant oil concentrate, a crop oil concentrate, a drift reduction and deposition adjuvant, a buffer, an acidifier, a nitrogen source, a compatibility agent, a basic blend, an adjuvant plus foliar fertilizer, a micronutrient, a macronutrient, a scent, a defoamer, an antifoam, an odor-masking agent, a spreading and sticking agent, a marker, a tank cleaner, a pH modifier, or a utility adjuvant. The function(s) of the MAAC may be selected by controllably changing at least one of the quantity and composition of solid agricultural particles present in the MAAC, the quantity and composition of the liquid component, the composition and quantity of the surfactant present in the MAAC, or the quantity, composition, and purpose of the additional components present in the MAAC.

In an embodiment, the MAAC is a water conditioner. Water conditioners are used with hard water to reduce scaling of hard minerals, sediment and other impurities in the water that can decrease an agricultural spray's performance. For instance, when AMS is used as a water conditioner, the AMS traps hard water ions and provides ammonium ions for improved uptake. In such an embodiment, the solid agricultural particles may form at least about 40 wt. % to about 80 wt. % of the MAAC, such as in ranges of about 50 wt. % to about 75 wt. % or about 60 wt. % to about 70 wt. %. As previously discussed, when the MAAC is a water conditioner, the surfactants that form the MAAC may include one or more of at least one ionic surfactant, at least one amphoteric surfactant, or a surfactant exhibiting a HLB of about 4 to about 30.

In an embodiment, the MAAC is a surfactant. Surfactants reduce the surface tension of water which facilitates maintaining an agricultural spray on the target (e.g., as opposed to rolling off a leaf into the soil) and/or a wetting agent that increases the spread of a droplet on a target surface (e.g., an increase in surface area of the droplet may increase efficacy). In such an embodiment, the solid agricultural particles may form at least about 40 wt. % to about 80 wt. % of the MAAC, such as in ranges of about 50 wt. % to about 75 wt. % or about 60 wt. % to about 70 wt. %.

In an embodiment, the MAAC is a high surfactant oil concentrate ("HSOC"). An HSOC contains MSO or other oil and an emulsifier and is generally used in applications with post-emergent pesticides (e.g., herbicides, fungicides, insecticides) that recommend MSO or other oil as an adjuvant. HSOCs may improve efficacy of typically oil-soluble active ingredients by increasing uptake by the target plant. The surfactant in HSOCs emulsifies the oil in an aqueous tank mix rather than to modify the surface tension of the tank mix. In such an embodiment, the solid agricultural particles may form at least about 40 wt. % to about 80 wt. % of the MAAC, such as in ranges of about 50 wt. % to about 75 wt. % or about 60 wt. % to about 70 wt. %.

In an embodiment, the MAAC is a crop oil concentrate (COC). COCs facilitate leaf penetration of an agricultural spray. COCs are distinct from HSOCs because COCs include less surfactant and/or emulsifiers than the HSOCs and COCs require a higher use rate than HSOCs. In such an embodiment, the solid agricultural particles may form at least about 40 wt. % to about 80 wt. % of the MAAC, such as in ranges of about 50 wt. % to about 75 wt. % or about 60 wt. % to about 70 wt. %.

In an embodiment, the MAAC is a drift reduction and deposition adjuvant. Drift reduction and deposition adjuvants improve spray deposition on intended targets and reduce spray drift. The MAAC may also include any of the rheology modifiers disclosed herein. As previously discussed, when the MAAC is a drift reduction and deposition adjuvant, the surfactants that form the MAAC may include one or more of at least one ionic surfactant, at least one amphoteric surfactant, or a surfactant exhibiting a HLB of about 4 to about 30.

In an embodiment, in use, the MAAC that is a drift reduction and deposition adjuvant may cause an agricultural spray including the MAAC to produce fewer fine droplets (e.g., droplets exhibiting a diameter that is less than 150 μm) and either reduce, maintain or increase by up to 100 percentage points (e.g., up to 75 percentage points, up to 50 percentage points, up to 25 percentage points, or up to 15 percentage points) the number of ultra-coarse droplets (e.g., droplets exhibiting a diameter that is greater than 622 μm) compared to a substantially similar agricultural spray that does not include the MAAC delivered under the same conditions (e.g., delivered from the same nozzle at the same pressure and flow rate). Regarding management of the level of ultra-coarse droplets produced, the increase in ultra-coarse droplets by up to 100 percentage points, and more particularly up to 50 percentage points, and more particularly up to 15 percentage points, relative to spraying the agricultural spray without the MAAC is an acceptable increase, as long as the number of fine droplets are simultaneously reduced relative to spraying the agricultural spray without the MAAC.

Applications of Use

The MAAC may be used in agricultural spray applications such as spraying seeds, soil, foliage and fruit. Agricultural sprays containing the disclosed MAACs may be delivered using ground and/or aerial spray applications. Application may be during the vegetative state, during planting, and/or after planting.

In some implementations, the MAAC may be provided as an in-can admixture of at least the solid agricultural particles dispersed in the liquid components. In addition or alternatively, the MAAC may be contained in a pesticide or other agricultural mixture for spray applications. In alternative implementations, the solid agricultural particles and the liquid components may be provided separately and admixed just prior to use. Admixing may be conducted under agitation.

Prior to use, the MAAC may be mixed (e.g. tank-mixed) with, for instance, water, water conditioners, pesticides, micronutrients, antimicrobial compositions, inert components, or other components of the agricultural spray. Admixing may be conducted under agitation. In addition or alternatively, admixing may take place at about 33° F. to about 100° F. or at ambient temperatures (e.g., about 70° F. to 90° F.) depending on climate, or may take place under elevated temperatures above 90° F. Mixing the MAAC with the other components (e.g., water) of the agricultural spray may results in spontaneous emulsification and/or rapid dissolution of the MAAC in the components of the agricultural spray. Mixing the MAACs disclosed herein with the other components of the agricultural spray may also activate the water-activated components of the MAAC if the MAAC includes the water-activated components.

The quantity of the MAAC mixed with the other components of the agricultural spray may depend on the function of the MAAC and the quantity (e.g., concentration) of active ingredients present in the MAAC. In an embodiment, the quantity of the MAAC mixed with the other components of the agricultural spray may be less (e.g., up to three times less) than a similar non-MAAC agricultural adjuvant composition that includes solid agricultural particles dissolved in water. For example, non-MAAC agricultural adjuvant components that include AMS dissolved in water include, at most, 41 wt. % AMS. However, the MAACs disclosed herein may include up to 90 wt % AMS. Further, the MAACs disclosed herein may also include a liquid component that is an active ingredient whereas the water of the non-MAAC agricultural adjuvant composition is an inactive ingredient.

The agricultural nozzles that may spray the agricultural sprays of the present disclosure may vary in size, shape, material, and other characteristics Examples of agricultural nozzles that may be used include drift reduction nozzles, such as nozzles that produce flat fan sprays. Agricultural nozzles may include those manufactured by TeeJet (TPI 11004 nozzle, XR11002-XR TeeJet Extended Range Flat Spray Tip, AIXR11004-AIXR TeeJet Spray Tip), Hypro, Greenleaf, Wilger, Lechler, including nozzle models such as AIXR, AI, TT, UCD and so on. The nozzle classifications for the agricultural nozzles that may spray the agricultural sprays include but are not limited to: extremely fine (XF), purple in color, with a VMD of approximately 50 μm; very fine (VF), red in color, with a VMD of <136 μm; fine (F), orange in color, with a VMD of 136-177 μm; medium (M), yellow in color, with a VMD of 177-218 μm; ultra-coarse (C), blue in color, with a VMD of 218-349 μm; very ultra-coarse (VC), green, with a VMD of 349-428 μm; extremely ultra-coarse (EC), white in color, with a VMD of 428-622 μm; and ultra-coarse (UC), black in color, with a VMD of >622 μm.

Example flow rates through the nozzles include about 0.0125 to about 2.0 gallons per minute (gpm) per nozzle. As a specific example, the flow rate of the nozzle may be variable and may range from about 0.2 to about 1.5 gpm per nozzle.

The nozzles may deliver spray at a spray angle of about 65° to about 140°, up to about 140°, about 90°, about 100°, about 110°, about 120°, about 130° or about 140°.

The spray nozzles may be operated at up to 115 psi fluid pressure, or about 15 to about 115 psi, about 30 to about 60 psi fluid pressure, or about 15, about 20, about 30, about 40, about 50, about 60, about 70, about 80, about 90, about 100, about 110 psi fluid pressure, or any integer range of the aforementioned pressure levels (e.g., about 15 to about 60 psi).

The following working examples provide further detail in connection with the specific embodiments described above.

Working Examples 1-3

Working Examples 1-3 each formed from approximately 100 g of granular ammonium sulfate that were milled in an IKA M 20 Universal Mill for 60 seconds each. Working Examples 1-3 were measured on three different particle size analysis instrumentation setups. The results of the particle size analysis of Working Examples 1-3 are shown in Table 1.

TABLE 1

| Sample | Instrument Model | D(v, 0.1) (μm) | D(v, 0.5) (μm) | D(v, 0.9) (μm) | Mean (μm) |
|---|---|---|---|---|---|
| Working Example 1 | Horiba LA-960 | 7.2 | 42.5 | 128.6 | 56.6 |
| Working Example 2 | Horiba LA-950 | 4.0 | 24.8 | 103.4 | 41.6 |
| Working Example 3 | Malvern Mastersizer 3000 | 7.3 | 55.3 | 172.0 | Not Available |

Working Example 4

Working Example 4 was formed by combining AMS and commercially available HSOC adjuvant (i.e., MSO source) at a weight to volume ratio of approximately 1:10 to form a mixture. The mixture was milled using a Silverson L5MA at 5000 RPM for 5 minutes to reduce the particle size of the AMS. Results from the milling visibly showed that the particle size of the AMS was reduced to a fine particle size in the HSOC adjuvant and the bulk liquid turned over well to achieve thorough mixing of the AMS and the HSOC adjuvant.

When high shearing was stopped, the AMS particles appeared to flocculate and settle over the course of several minutes in the HSOC adjuvant. However, the settled AMS particles were easily resuspended with light agitation (hand mixing with a spatula).

Working Example 4 was dropped into tap water using a pipette to form a tank mix. Working Example 4 formed an emulsion in the tap water without agitation. The tank mix that included Working Example 4 was filtered through #3 filter paper to observe if any AMS particles did not dissolve in the tap water. No AMS particles remained on the filter paper indicating that AMS is easily dissolved into the tap water.

Working Example 5

Working Example 5 was formed by combining AMS and the commercially available HSOC adjuvant of Working Example 4 at a weight to volume ratio of approximately 1:1. The mixture was milled using a Silverson L5MA at 5000 RPM for 5 minutes to reduce the particle size of the AMS. Results from the milling visibly showed that the particle size of the AMS was not reduced to the fine particle size of Working Example 4. Working Example 5 exhibited high shear thinning behavior and the bulk liquid had very poor turnover with batch milling in the Silverson L5MA.

Working Example 5 was dropped into tap water using a pipette to form a tank mix. Working Example 5 immediately sunk to the bottom of a beaker that included the tank mix indicating that the larger particle size inhibits rapid dissolution of Working Example 5 in water.

Working Example 6

Working Example 6 was formed by combining AMS and the commercially available HSOC adjuvant of Working Example 4 at a weight to volume ratio of approximately 1:1. Working Example 6 was subjected to additional high-shear milling to achieve small particle size and create a concentrated formulation (1:1 ratio of AMS:HSOC). In particular, 200 g of Working Example 6 was milled for 6000 RPM for 1 min, 7000 RPM for 2 min, and 8000 RPM for about 30 seconds. Working Example 6 was filtered using #42 filter paper to filter out the AMS from the HSOC adjuvant. The AMS was washed 3 times with acetone and dried at 40° C. to obtain a fine powder. The dried AMS powder was then screened through a 300 μm screen.

Prior to filtering, washing, and drying the AMS powder, Working Example 6 exhibited poor bulk liquid turnover. Working Example 6 also exhibited a higher temperature than Working Example 5 due to the milling process. Working Example 6 did not exhibit a visibly smaller particle size compared to Working Example 5.

Working Examples 7-9

Working Example 6 was filtered using #42 filter paper to filter out the AMS from the HSOC adjuvant. The AMS was washed 3 times with acetone and dried at 40° C. to obtain a fine powder. The dried AMS powder was then screened through a 300 μm screen. The screened AMS was then added to the HSOC adjuvant of Working Example 4 to form Working Examples 7-9. In particular, Working Example 7 exhibited a weight ratio of AMS to the HSOC adjuvant of 1:1, Working Example 8 exhibited a weight ratio of AMS to the HSOC adjuvant of 3:2, and Working Example 9 exhibited a weight ratio of AMS to the HSOC adjuvant of 3:1. Working Example 7 was a pourable liquid, Working Example 8 was a fluid-like paste, and Working Example 9 was a paste. As such, Working Examples 7-9 demonstrates that increasing the ratio of AMS to the HSOC adjuvant increases the viscosity of the mixture.

Working Example 10

Working Example 10 was formed by dry milling AMS using an IKA M 20 Universal Mill for 60 seconds and then mixing 100 g of AMS in MSO at a weight ratio of 1:1. No surfactant was added to Working Example 10. Working Example 10 remained fluid. Working Example 10 demonstrated that AMS easily dispersed into the MSO.

Working Example 11

Working Example 11 was formed by dry milling AMS using an IKA M 20 Universal Mill for 60 seconds and then mixing the AMS in MSO at a weight ratio of 2:1. No surfactant was added to Working Example 11. Working Example 11 was a paste.

Working Example 11 was dropped into tap water using a pipette to form a tank mix. Working Example 11 created small spheres of AMS in MSO within the bulk water. Stirring only broke up the spheres into smaller spheres, which then coalesced when they settled on the bottom of the beaker. The AMS eventually dissolves in the water after several hours.

Working Example 11 demonstrated that surfactants may be needed to create a highly concentrated AMS in MSO formulations. Working Example 11 also demonstrated that surfactants may also be needed to emulsify the MSO in an aqueous tank mix.

Working Examples 12 and 13

Working Examples 12 and 13 included a mixture of AMS and a liquid formation in a weight ratio of 1:1. The liquid formation was a mixture of a proprietary surfactant exhibiting an HLB of 10-15 and MSO. The liquid formation of Working Example 12 contained 5 wt. % of the surfactant and 95 wt. % MSO. The liquid formulation of Working Example 13 contained 10 wt. % surfactant and 90 wt. % MSO.

The AMS of working Examples 12 and 13 was dry milled in an IKA M 20 Universal Mill for 60 seconds and then added to the liquid formulation to form a homogenous liquid. Both Working Examples 12 and 13 were very fluid.

Droplets of Working Examples 12 and 13 were added to a beaker that includes tap water to form a tank mix. Droplets of both Working Examples 12 and 13 sank to bottom of beaker but then begin to break up and disperse spontaneously. Working Examples 12 and 13 were fully dispersed in the tank mix with very light agitation.

Working Example 14

Working Example 9 was pressed into a small pellet using a stainless steel pellet press to form Working Example 14. Working Example 14 was gently dropped into large beaker of water. Working Example 14 sunk to the bottom of the beaker but spontaneously began to disperse. Working Example 14 was completely dispersed with very light agitation (gently swirling the beaker by hand).

Working Examples 15-19

Working Examples 15-19 each contained 25.03 wt. % MSO, 3.57 wt. % surfactant, and 71.4 wt. % AMS. The surfactant of Working Example 15 was a modified polyether, the surfactant of Working Example 16 was an organically modified polymer, the surfactant of Working Example 17 was a tallow amine ethoxylate exhibiting an HLB of 9, the surfactant of Working Example 18 was an alkyl EO/PO copolymer, and the surfactant of Working Example 19 was a difunctional block copolymer surfactant exhibiting an HLB of 7-12.

The AMS of Working Examples 15-19 were dry milled in an IKA M 20 Universal Mill for 60 seconds and then added to the liquid components (e.g., MSO and surfactant).

Working Examples 15-19 were visually inspected to determine the viscosity thereof. Working Example 15 was a viscous liquid that was pourable. Working Example 16 exhibited clumping of the AMS particles. Working Example 17 was a viscous liquid that was pourable. However, Working Example 17 exhibited a viscosity that was less than Working Example 15. Both Working Examples 18 and 19 were thick pastes that were not pourable. Working Examples 15-19 show that the type of surfactant used in the MAAC greatly affects the physical characteristics of the MAAC.

Working Examples 20-30 and Comparative Examples 1-5

Each of Working Examples 20-30 contained 20 wt. % MSO, 3.33 wt. % surfactant 1, 10 wt. % surfactant 2, and 66.7 wt. % AMS. Surfactant 1 was the same for each of Working Examples 20-30 and is proprietary surfactant with an estimated HLB of 10-15. The composition of surfactant 2 was different for each of Working Examples 20-30 and are provided in Table 2. Table 2 also lists the HLB for some of the surfactant 2's.

TABLE 2

| Working Example | Surfactant 2 Class | HLB |
|---|---|---|
| 20 | Sodium lauryl ether sulfate | 30+ |
| 21 | Polyglycerol ester | — |
| 22 | Polyglycerol ester | 6 |
| 23 | Polyoxyethylene sorbitan monolaurate | 16 |
| 24 | Glucamide | 13 |
| 25 | Tallow amine ethoxylate | 9 |
| 26 | Nonyl phenol ethoxylate | 13 |
| 27 | Castor oil ethoxylate | 12.6 |
| 28 | Proprietary blend | 10-15 |
| 29 | Proprietary blend | 8 |
| 30 | Alkyl polyglycoside | 13 |

The AMS of each of Working Examples 20-30 were dried milled in an IKA M 20 Universal Mill for 60 seconds and then added to the liquid component (e.g., MSO and surfactant). Each of Working Examples 20-28 and 30 were flowable liquids. Working Example 29 exhibited a paste-like consistency.

Comparative Example 1 was not a spray and is used to denote crops that did not receive a spray. Comparative Example 2 included only water. Comparative Example 3 was a commercially available AMS-based water conditioner. Comparative Example 4 includes dry AMS. Comparative Example 5 includes the commercially available AMS-based water conditioner of Comparative Example 3 and an HSOC adjuvant.

Working Examples 20-30 and Comparative Examples 1-5 were studied to determine the effect of Working Examples 20-30 and Comparative Examples 1-5 on glufosinate-based herbicide efficacy by creating agricultural tank mixes and applying the tank mix to greenhouse-grown plants. Working Examples 20-30 and Comparative Examples 2-5 were mixed with the glufosinate-based herbicide Liberty® in two batches. In the first batch, Working Examples 20-30 and Comparative Examples 2-5 were mixed with Liberty® at 0.75× the label use rate. In the second batch, Working Examples 20-30 and Comparative Examples 2-5 were mixed with Liberty® at 0.6× the label use rate.

Working Examples 20-30 formed 1% (v/v) of the tank mix. The amount of the AMS-based-water conditioner in Comparative Examples 3 and 5 was selected such that Comparative Examples 3 and 5 included the same amount of AMS in each of Working Examples 20-30. The amount of the dry AMS in Comparative Example 3 was 3 lbs/acre. The amount of the HSOC adjuvant in Comparative Example 5 was the same as the amount of surfactants and MSO in each of Working Examples 20-30.

The first batch was sprayed on cowpeas and sorghum at a 15 gal/acre application rate. The second batch was sprayed on cowpeas at a 15 gal/acre application rate.

Table 3 combines information from both sets of batches for Working Examples 20-30 and Comparative Examples 1-5. Results are given as percent visual control of the sprayed plants. 0% control represents no visual herbicide injury. 100% control represents complete plant death. Table 3 confirms that glufosinate can have inconsistent performance depending on plant type and environmental conditions (in the greenhouse, dependent on sunlight during the trial). Table 3 also demonstrates that addition of an adjuvant improves the performance of Liberty® on broad leaf plants (cowpeas). Working Examples 20-30 have similar or better performance than Comparative Examples 1-5. Further, Table 3 demonstrates that control of grasses (sorghum) is more difficult and variable with glufosinate and dependent on adjuvant formulation.

TABLE 3

| Tank Mix | Cowpea, Batch 1 | Sorghum, Batch 1 | Cowpea, Batch 2 |
| --- | --- | --- | --- |
| Comparative Example 1 | 0 | 0 | 0 |
| Comparative Example 2 | 50 | 84 | 95 |
| Comparative Example 3 | 80 | 86 | 100 |
| Comparative Example 4 | 77 | 76 | 100 |
| Comparative Example 5 | 87 | 84 | 100 |
| Working Example 20 | 77 | 86 | 100 |
| Working Example 21 | 78 | 88 | 100 |
| Working Example 22 | 97 | 72 | 100 |
| Working Example 23 | 88 | 85 | 100 |
| Working Example 24 | 91 | 62 | 100 |
| Working Example 25 | 87 | 64 | 100 |
| Working Example 26 | 90 | 74 | 100 |
| Working Example 27 | 94 | 73 | 100 |
| Working Example 28 | 92 | 76 | 100 |
| Working Example 29 | 86 | 77 | 100 |
| Working Example 30 | 95 | 72 | 100 |

Working Examples 31-41 and Comparative Examples 6-9

Working Examples 31-41 are the same as Working Examples 20-30, respectively.

Comparative Example 6 was not a spray and is used to denote crops that did not receive a spray. Comparative Example 7 included only water. Comparative Example 8 included an HSOC adjuvant. Comparative Example 9 includes the same HSOC adjuvant as Comparative Example 8 and an AMS-based water conditioner.

Working Examples 31-41 and Comparative Examples 6-9 were studied to determine the effect Working Examples 31-41 and Comparative Examples 6-9 have on clethodim-based herbicide efficacy by creating agricultural tank mixes and applying the tank mix to greenhouse-grown plants. Working Examples 31-41 and Comparative Examples 7-9 were mixed with the clethodim-based herbicide Section® Three at 1 fluid ounce per acre.

Working Examples 31-41 formed 1% (v/v) of the tank mix. The amount of the HSOC adjuvant in Comparative Examples 8 and 9 was the same as the amount of surfactant and MSO in Working Examples 31-41 and the amount of AMS-based-water conditioner in Comparative Example 9 was selected such that Comparative Example 9 included the same amount of AMS as Working Examples 31-41.

The tank mix for each of Working Examples 31-41 and Comparative Examples 6-9 were sprayed on wheat and corn at 15 gal/acre application rate.

Table 4 combines information from testing Working Examples 31-41 and Comparative Examples 6-9. Results are given as % visual control of the sprayed plants. 0% control represents no visual herbicide injury. 100% control represents complete plant death. Table 3 demonstrates that addition of Working Examples 31-41 improves the performance of clethodim on grasses (wheat and corn). Working Examples 31-41 have similar or better performance than Comparative Examples 6-9.

TABLE 4

| Tank Mix | Wheat | Corn |
| --- | --- | --- |
| Comparative Example 6 | 0 | 0 |
| Comparative Example 7 | 0 | 0 |
| Comparative Example 8 | 58 | 100 |
| Comparative Example 9 | 62 | 100 |
| Working Example 31 | 64 | 100 |
| Working Example 32 | 68 | 100 |
| Working Example 33 | 68 | 100 |
| Working Example 34 | 56 | 100 |
| Working Example 35 | 52 | 100 |
| Working Example 36 | 67 | 100 |
| Working Example 37 | 62 | 100 |
| Working Example 38 | 62 | 100 |
| Working Example 39 | 52 | 100 |
| Working Example 40 | 68 | 100 |
| Working Example 41 | 69 | 100 |

Working Examples 42-52 and Comparative Examples 10 and 11

Working Examples 42-52 are the same as Working Examples 20-30, respectively.

Comparative Example 10 only included water. Comparative Example 11 contained a commercially available drift reduction adjuvant.

Each of Working Examples 42-52 and Comparative Examples 10 and 11 were disposed in water to form a tank mix. Each tank mix also contained 29 fl oz/acre of the herbicide Liberty®. Working Examples 42-52 formed 1% (v/v) of the corresponding tank mix. Comparative Example 11 formed 4 fluid ounces/acre of the corresponding tank mix.

Each of the tank mixes were sprayed through an XR11003 TeeJet nozzle at 10 gal/acre and 40 psi. Droplet size distribution for each of the tank mixes was measured using laser diffraction.

Table 5 combines information from testing Working Examples 42-52 and Comparative Examples 10 and 11. Table 5 demonstrates that Comparative Example 11 does not reduce the volume of fines (droplets<150 microns in diameter). Each of Working Examples 42-52 provide some level of fines reduction, dependent on the combination of surfactants. Working Examples 42 and 50 reduce the volume of fines by more than 40%. Drift reduction properties are in addition to the water conditioning and high surfactant oil concentrate benefits demonstrated in Working Examples 20-41.

TABLE 5

| Tank Mix | Droplets <150 microns (vol %) | D(v, 0.5) (microns) |
| --- | --- | --- |
| Comparative Example 10 | 30.9 | 204.5 |
| Comparative Example 11 | 31.8 | 201.0 |
| Working Example 42 | 23.6 | 226.6 |
| Working Example 43 | 19.9 | 237.8 |
| Working Example 44 | 18.4 | 243.0 |

TABLE 5-continued

| Tank Mix | Droplets <150 microns (vol %) | D(v, 0.5) (microns) |
|---|---|---|
| Working Example 45 | 21.3 | 235.7 |
| Working Example 46 | 25.9 | 219.6 |
| Working Example 47 | 21.4 | 234.7 |
| Working Example 48 | 23.3 | 226.4 |
| Working Example 49 | 27.8 | 212.6 |
| Working Example 50 | 18.3 | 241.7 |
| Working Example 51 | 22.5 | 229.2 |
| Working Example 52 | 24.1 | 223.6 |

Working Examples 53 and 54 and Comparative Examples 12 and 13

Comparative Example 12 was a tank mix including water and the glufosinate-based herbicide Liberty®. The amount of Liberty® in Comparative Example 12 was selected such that, when sprayed, Liberty® was applied at a rate of 20 fluid ounces per acre. Comparative Example 13 was a tank mix that was the same as Comparative Example 12 except that Comparative Example 13 also included a commercially available drift reduction and deposition adjuvant. The commercially available drift reduction and deposition adjuvant was an MSO-based drift reduction technology containing both nonionic and anionic surfactants. The amount of the commercially available drift reduction and deposition adjuvant was selected such that, when sprayed, the commercially available drift reduction and deposition adjuvant was applied at a rate of 4 ounces per acre. Working Examples 53 and 54 were tank mixes that were the same as Comparative Example 12 except that different MAACs were added to the tank mixes of Working Examples 53 and 54. The MAACs that were added to Working Examples 53 and 54 were composed of 42 wt. % to 90 wt. %, 15 wt. % to 40 wt. % MSO, and 10 wt. % to 15 wt. % of a surfactant blend. The surfactant blend included a polymeric nonionic dispersing agent, polyglycerol ester, isopropyl myristate, and a proprietary surfactant blend. The MAACs of Working Examples 53 and 54 formed 1 volume % of the tank mixes.

Each of the tank mixes were sprayed through an XR11003 TeeJet nozzle at 10 gal/acre and 40 psi. Droplet size distribution for each of the tank mixes was measured using laser diffraction.

The FIGURE is a graph combining the information from testing Working Examples 53 and 54 and Comparative Examples 12 and 13. As shown in The FIGURE, the MAACs of Working Examples 53 and 54 significantly decrease the number of fine droplets considered driftable compared to Comparative Examples 12 and 13.

Working Examples 55-62 and Comparative Example 14

Working Examples 55-62 are the same as Working Examples 42-45 and 47-49, respectively. Comparative Example 14 is the same as Comparative Example 11.

The viscosity of Working Examples 55-62 and Comparative Example 14 were measured using a Brookfield DV-E viscometer with a LV-4 spindle at 0.3 RPM. Measurements were taken after 5 min to ensure steady state. This protocol mimics that in Examples 24-35 from U.S. Pat. No. 6,423,667.

Table 6 shows the results of the viscosity measurements of Working Examples 55-62 and Comparative Example 14. Table 6 shows that Working Examples 55, 56, and 58-60 and Comparative Example 14 exhibit very low viscosity that were sufficiently low that the Brookfield DV-E viscometer with a LV-4 spindle was unable to measure the viscosity thereof, resulting in a viscosity of "0". These results are in contrast to those of U.S. Pat. No. 6,423,667, which reported viscosities of at least 100 cP. In other words, the viscosities of many of the MAACs disclosed herein are significantly less than 100 cP, such as less than about 75 cP, less than about 50 cP, or less than about 25 cP.

TABLE 6

| Sample | Viscosity (cP) |
|---|---|
| Comparative Example 14 | 0 |
| Working Example 55 | 0 |
| Working Example 56 | 0 |
| Working Example 57 | 2630 |
| Working Example 58 | 0 |
| Working Example 59 | 0 |
| Working Example 60 | 0 |
| Working Example 61 | 15690 |
| Working Example 62 | 1750 |

Working Examples 63-70 and Comparative Example 15

Working Examples 63-70 are the same as Working Examples 42-45 and 47-50, respectively. Comparative Example 15 is the same as Comparative Example 11.

The dissolution of Working Examples 63-70 and Comparative Example 15 in water were tested by introducing 1 mL of Working Examples 63-70 and Comparative Example 15 into 60 mL of tap water in a 100 mL beaker with a ⅜ inch by 1.5 inch long magnetic stirring bar turning at a constant but moderate speed (e.g., 300 RPM). This test is similar to the dissolution test disclosed in U.S. Pat. No. 6,423,667 except that the viscosities of Working Examples 63-70 and Comparative Example 15 were too low to add 0.16 g of Working Examples 63-70 and Comparative Example 15 on a 5 mm×5 mm piece of wax film. A timer was started after each of Working Examples 63-70 and Comparative Example 15 had been added to the water. The timer was stopped after emulsification of each of Working Examples 63-70 and Comparative Example 15 was complete by visual inspection (homogenous cloudy liquid) and dissolution was complete (e.g., no visible particulate).

Table 7 illustrates the results of the dissolution tests. Table 7 shows that Working Examples 63-70 rapidly emulsified and dissolved in the tap water, the majority in under 30 seconds. This is in contrast to the results of U.S. Pat. No. 6,423,667, in which the majority of samples took more than 60 seconds to dissolve. In other words, the MAAC may dissolve in water (under the experimental conditions disclosed herein) in less than about 45 seconds or less than 30 seconds. Further, Table 7 shows that a greater quantity of Working Examples 63-70 dispersed within the tap water at a faster rate than less quantity of material discussed in U.S. Pat. No. 6,423,667.

TABLE 7

| Sample | Dissolution time (seconds) |
|---|---|
| Comparative Example 15 | 34 |
| Working Example 63 | 73 |
| Working Example 64 | 8 |

TABLE 7-continued

| Sample | Dissolution time (seconds) |
|---|---|
| Working Example 65 | 7 |
| Working Example 66 | 7 |
| Working Example 67 | 29 |
| Working Example 68 | 6 |
| Working Example 69 | 3 |
| Working Example 70 | 3 |

Working Examples 71-75

Working Examples 71-75 included AMS, MSO, a surfactant 1, and a surfactant 2 in different amounts. Surfactant 1 and surfactant 2 were the same for each of Working Examples 71-75. Surfactant 1 was a proprietary surfactant with an estimated HLB of 10-15. Surfactant 2 was a polyglycerol ester with an HLB of 6.

The viscosities of Working Examples 71-75 were tested using the same method as Working Examples 55-62. The dissolution of Working Examples 71-75 was tested using the same method as Working Examples 63-70.

Table 8 shows the results of the viscosity testing and the dissolution testing of Working Examples 71-75. Table 8 show that these particular blend of surfactants requires at least 3.4 wt. % surfactant to create an emulsion. The amount of surfactant required will vary based on the type of surfactant used. Table 8 also shows that a wide range of compositions can be used to create a formulation that can be emulsified/dissolved in water to create an agricultural tank mix

TABLE 8

| Sample | AMS (wt %) | MSO (wt %) | Surfactant 1 (wt %) | Surfactant 2 (wt %) | Viscosity (cP) | Dissolution (seconds) |
|---|---|---|---|---|---|---|
| Working Example 71 | 99 | 0.5 | 0.25 | 0.25 | N/A (solid) | 8 |
| Working Example 72 | 33 | 33 | 16.5 | 16.5 | 0 | 2 |
| Working Example 73 | 0.5 | 99 | 0.25 | 0.25 | 0 | N/A (did not form an emulsion) |
| Working Example 74 | 0.5 | 0.5 | 49.5 | 49.5 | 0 | 6 |
| Working Example 75 | 0.5 | 96.1 | 1.7 | 1.7 | 0 | >300 |

Working Examples 76-79

Working Examples 76-79 are the same as Working Examples 20, 21, 23, and 25, respectively. Working Examples 76-79 were held at 54° C. for 12 days. After 12 days, the amount of oil separation was observed to test the stability of Working Examples 76-79.

Table 9 shows the results of the stability testing of Working Examples 76-79. Table 9 shows that Working Examples 76-79 were stable since Working Examples 76-79 exhibited minimal oil separation (e.g., about 25% or less) after 12 days at temperatures above room temperature. In other words, Working Examples 76-79 demonstrate that at least some of the MAACs disclosed herein are expected to be stable (e.g., exhibit minimal oil separation) after at least 12 days at a temperature of about 54° C. Working Examples 76-79 also demonstrates that the stability of the MAACs disclosed herein depends at least partially on the surfactant used therein.

It is noted that the oil separation of Working Examples 76-79 is expected to occur at a significantly slower rate at room temperature (e.g., about 25° C.) than at 54° C. Thus, it is expected that Working Examples 76-79 (and at least some of the other MAACs disclosed herein) are expected to be stable and exhibit minimal oil separation after at least one month, after at least two months, at least six months, or after one year while being stored at room temperature.

TABLE 9

| Sample | Surfactant 2 Class | % Oil Separation |
|---|---|---|
| Working Example 76 | Sodium lauryl ether sulfate | 25 |
| Working Example 77 | Polyglycerol ester | 0 |
| Working Example 78 | Polyoxyethylene sorbitan monolaurate | 0 |
| Working Example 79 | Tallow amine ethoxylate | 10 |

While certain embodiments and details have been included herein and in the attached invention disclosure for purposes of illustrating the invention, it will be apparent to those skilled in the art that various changes in the methods and apparatus disclosed herein may be made without departing form the scope of the invention, which is defined in the appended claims. The words "including" and "having," as used herein, including the claims, shall have the same meaning as the word "comprising."

We claim:

1. A multifunctional agricultural adjuvant composition, comprising:
one or more liquid components comprising a high surfactant oil concentrate, the high surfactant oil concentrate comprising methylated seed oil, the high surfactant oil present at about 20 wt % of the composition;
one or more solid ammonium sulfate particles present at about 66.7 wt % of the composition and dispersed in the one or more liquid components; and
one or more surfactants present at about 13.3 wt % of the composition, wherein at least one of the one or more surfactants is sodium lauryl ether sulfate exhibiting a hydrophilic-lipophilic balance of about 30, and wherein the one or more surfactants are free of non-ionic surfactants,
wherein the multifunctional agricultural adjuvant composition is an oil dispersion free of water.

2. The multifunctional agricultural adjuvant composition of claim 1, wherein the one or more surfactants comprise one or more ionic surfactants.

3. The multifunctional agricultural adjuvant composition of claim 1, wherein the one or more surfactants comprise one or more amphoteric surfactants.

4. A multifunctional agricultural adjuvant composition, comprising:
one or more liquid components, the one or more liquid components comprising methylated seed oil present at about 20 wt % of the composition;
one or more solid agricultural particles dispersed in the one or more liquid components, the one or more solid agricultural particles comprising ammonium sulfate and forming about 66.7 wt % of the composition; and
one or more surfactants present at about 13.3 wt % of the composition, wherein at least one of the one or more surfactants exhibit a hydrophilic lipophilic balance (HLB) of about 30, wherein the surfactant having HLB 30 consists of sodium lauryl ether sulfate; and wherein the one or more surfactants are free of non-ionic surfactants;
wherein the multifunctional agricultural adjuvant composition is an oil dispersion free of water.

5. The multifunctional agricultural adjuvant composition of claim 4, further comprising at least one of petroleum oil, vegetable oil, seed oil, paraffinic oil, mineral oil, naphthenic oil, aromatic oil, or petroleum distillates.

6. The multifunctional agricultural adjuvant composition of claim 4, wherein the one or more surfactants comprises at least one of one or more ionic surfactants or one or more amphoteric surfactants.

7. The multifunctional agricultural adjuvant composition of claim 4, further comprising at least one rheology modifier.

8. The multifunctional agricultural adjuvant composition of claim 4, further comprising one or more antifoams, one or more structuring agents, one or more soluble pesticides that are soluble in the one or more liquid components, or one or more soluble solid agricultural particles that are soluble in the one or more liquid components.

9. The multifunctional agricultural adjuvant composition of claim 4, further comprising one or more water-sensitive components, wherein each of the one or more water-sensitive components are in an initial state, and wherein the initial state is a dormant state for a water-activated component or an active state for a water-deactivated component.

10. The multifunctional agricultural adjuvant composition of claim 4, wherein the multifunctional agricultural adjuvant composition is at least one of a water conditioner or a drift reduction and deposition adjuvant.

11. The multifunctional agricultural adjuvant of claim 4, wherein the multifunctional agricultural adjuvant composition is at least one of a surfactant, a high surfactant oil concentrate, or a crop oil concentrate.

12. The multifunctional agricultural adjuvant composition of claim 1, wherein the one or more surfactants comprises a first surfactant present at about 3.33 wt % of the composition and a second surfactant present at about 10 wt % of the composition, wherein the first surfactant has an estimated hydrophilic-lipophilic balance of about 10-15, and the second surfactant is sodium lauryl ether sulfate.

* * * * *